US008475265B2

(12) United States Patent
Lafky et al.

(10) Patent No.: US 8,475,265 B2
(45) Date of Patent: *Jul. 2, 2013

(54) GAMING SYSTEM, GAMING DEVICE, AND METHOD FOR PROVIDING A MULTIPLE PLAYER PERSISTENT GAME

(75) Inventors: Ernest M. Lafky, San Francisco, CA (US); Carmen Tan, Daly City, CA (US); Mark C. Nicely, Daly City, CA (US)

(73) Assignee: IGT, Reno, NV (US)

(*) Notice: Subject to any disclaimer, the term of this patent is extended or adjusted under 35 U.S.C. 154(b) by 2 days.

This patent is subject to a terminal disclaimer.

(21) Appl. No.: 13/247,024

(22) Filed: Sep. 28, 2011

(65) Prior Publication Data
US 2013/0079109 A1 Mar. 28, 2013

(51) Int. Cl.
*G06F 17/00* (2006.01)
(52) U.S. Cl.
USPC .................................................. 463/25
(58) Field of Classification Search
USPC ................................ 463/16–25, 42
See application file for complete search history.

(56) References Cited

U.S. PATENT DOCUMENTS

| | | | |
|---|---|---|---|
| 3,167,313 A | 1/1965 | Davenport et al. | |
| 3,281,149 A | 10/1966 | Miller | |
| 4,003,578 A | 1/1977 | Jones | |
| 4,103,895 A | 8/1978 | Pressman et al. | |
| 4,182,515 A | 1/1980 | Nemeth | |
| 4,277,067 A | 7/1981 | Gettleman | |
| 4,323,242 A | 4/1982 | Rosenfeld | |
| 4,339,798 A | 7/1982 | Hedges et al. | |
| 4,511,143 A | 4/1985 | Sankrithi | |
| 4,624,459 A | 11/1986 | Kaufman | |
| 4,669,731 A | 6/1987 | Clarke | |
| 4,695,053 A | 9/1987 | Vazquez, Jr. et al. | |
| 4,743,024 A | 5/1988 | Helm et al. | |

(Continued)

FOREIGN PATENT DOCUMENTS

| EP | 0449433 | 10/1991 |
|---|---|---|
| EP | 0464935 | 1/1992 |

(Continued)

OTHER PUBLICATIONS

Office Action for U.S. Appl. No. 13/246,968, dated Sep. 26, 2012.

(Continued)

*Primary Examiner* — Ronald Laneau
(74) *Attorney, Agent, or Firm* — Neal, Gerber & Eisenberg LLP

(57) ABSTRACT

A gaming system including a multiple player persistent game, such as an ongoing community game. This ongoing community game includes a community game matrix which is continuously displayed to at least each of the players. The community game matrix includes a plurality of displayed positions which may be associated with an award or an award opportunity. In operation, at least each of the players playing the gaming devices of the gaming system are associated with a displayed participant that moves (either randomly or based on the player's control) to different of the displayed positions of the community game matrix. If a player moves their associated participant to a displayed position that is associated with an award or an award opportunity, the gaming system provides the player any associated award or enables the player to participate in any associated award opportunity to potentially win an award.

18 Claims, 7 Drawing Sheets

U.S. PATENT DOCUMENTS

| | | |
|---|---|---|
| 4,775,155 A | 10/1988 | Lees |
| 4,805,907 A | 2/1989 | Hagiwara |
| 4,836,546 A | 6/1989 | DiRe et al. |
| 4,837,728 A | 6/1989 | Barrie et al. |
| 4,850,592 A | 7/1989 | Winter |
| 4,856,787 A | 8/1989 | Itkis |
| 4,906,005 A | 3/1990 | Manabe |
| 4,991,848 A | 2/1991 | Greenwood et al. |
| 5,083,271 A | 1/1992 | Thacher et al. |
| 5,083,800 A | 1/1992 | Lockton |
| 5,092,598 A | 3/1992 | Kamille |
| 5,152,529 A | 10/1992 | Okada |
| 5,178,390 A | 1/1993 | Okada |
| 5,178,395 A | 1/1993 | Lovell |
| 5,186,460 A | 2/1993 | Fongeallaz et al. |
| 5,205,555 A | 4/1993 | Hamann |
| 5,242,163 A | 9/1993 | Fulton |
| 5,259,616 A | 11/1993 | Bergmann |
| 5,275,400 A | 1/1994 | Weingardt et al. |
| 5,299,810 A | 4/1994 | Pierce et al. |
| 5,324,041 A | 6/1994 | Boylan et al. |
| 5,332,219 A | 7/1994 | Marnell, II et al. |
| 5,333,868 A | 8/1994 | Goldfarb |
| 5,342,047 A | 8/1994 | Heidel et al. |
| 5,355,442 A | 10/1994 | Paglieroni et al. |
| 5,393,057 A | 2/1995 | Marnell, II |
| 5,411,271 A | 5/1995 | Mirando |
| 5,449,173 A | 9/1995 | Thomas et al. |
| 5,456,465 A | 10/1995 | Durham |
| 5,472,196 A | 12/1995 | Rusnak |
| 5,486,005 A | 1/1996 | Neal |
| 5,536,016 A | 7/1996 | Thompson |
| 5,560,603 A | 10/1996 | Seelig et al. |
| 5,564,700 A | 10/1996 | Celona |
| 5,564,701 A | 10/1996 | Dettor |
| 5,566,942 A | 10/1996 | Elum |
| 5,569,083 A | 10/1996 | Fioretti |
| 5,580,309 A | 12/1996 | Piechowiak et al. |
| 5,611,730 A | 3/1997 | Weiss |
| 5,630,753 A | 5/1997 | Fuchs |
| 5,639,089 A | 6/1997 | Matsumoto et al. |
| 5,645,486 A | 7/1997 | Nagao et al. |
| 5,647,798 A | 7/1997 | Falciglia |
| 5,655,961 A | 8/1997 | Acres et al. |
| 5,664,998 A | 9/1997 | Seelig et al. |
| 5,722,891 A | 3/1998 | Inoue |
| 5,741,183 A | 4/1998 | Acres et al. |
| 5,752,882 A | 5/1998 | Acres et al. |
| 5,755,619 A | 5/1998 | Matsumoto et al. |
| 5,758,875 A | 6/1998 | Giacalone, Jr. |
| 5,761,647 A | 6/1998 | Boushy |
| 5,769,716 A | 6/1998 | Saffari et al. |
| 5,772,509 A | 6/1998 | Weiss |
| 5,779,242 A | 7/1998 | Kaufmann |
| 5,779,544 A | 7/1998 | Seelig et al. |
| 5,779,549 A | 7/1998 | Walker et al. |
| 5,788,573 A | 8/1998 | Baerlocher et al. |
| 5,796,716 A | 8/1998 | Smith |
| 5,813,672 A | 9/1998 | Loud, Jr. |
| 5,820,459 A | 10/1998 | Acres et al. |
| 5,823,874 A | 10/1998 | Adams |
| 5,833,536 A | 11/1998 | Davids et al. |
| 5,833,537 A | 11/1998 | Barrie |
| 5,836,817 A | 11/1998 | Acres et al. |
| 5,836,818 A | 11/1998 | Jones et al. |
| 5,848,932 A | 12/1998 | Adams |
| 5,851,148 A | 12/1998 | Brune et al. |
| D404,436 S | 1/1999 | McGahn et al. |
| 5,855,514 A | 1/1999 | Kamille |
| 5,855,515 A | 1/1999 | Pease et al. |
| 5,873,781 A | 2/1999 | Keane |
| 5,876,284 A | 3/1999 | Acres et al. |
| 5,882,261 A | 3/1999 | Adams |
| 5,902,983 A | 5/1999 | Crevelt et al. |
| 5,909,875 A | 6/1999 | Weingardt |
| 5,911,418 A | 6/1999 | Adams |
| 5,924,927 A | 7/1999 | Matsuura et al. |
| 5,927,714 A | 7/1999 | Kaplan |
| 5,931,467 A | 8/1999 | Kamille |
| 5,934,999 A | 8/1999 | Valdez |
| 5,935,002 A | 8/1999 | Falciglia |
| 5,947,820 A | 9/1999 | Morro et al. |
| 5,951,012 A | 9/1999 | Feola |
| 5,951,397 A | 9/1999 | Dickinson |
| 5,961,384 A | 10/1999 | Robinson |
| 5,964,463 A | 10/1999 | Moore, Jr. |
| 5,976,015 A | 11/1999 | Seelig et al. |
| 5,980,384 A | 11/1999 | Barrie |
| 5,984,781 A | 11/1999 | Sunaga |
| 5,997,400 A | 12/1999 | Seelig et al. |
| 5,997,401 A | 12/1999 | Crawford |
| 6,004,207 A | 12/1999 | Wilson, Jr. et al. |
| 6,012,982 A | 1/2000 | Piechowiak et al. |
| 6,015,344 A | 1/2000 | Kelly et al. |
| 6,015,346 A | 1/2000 | Bennett |
| 6,019,369 A | 2/2000 | Nakagawa et al. |
| 6,033,307 A | 3/2000 | Vancura |
| 6,039,648 A | 3/2000 | Guinn et al. |
| 6,048,269 A | 4/2000 | Burns et al. |
| 6,050,895 A | 4/2000 | Luciano, Jr. et al. |
| 6,059,289 A | 5/2000 | Vancura |
| 6,059,658 A | 5/2000 | Mangano et al. |
| 6,077,162 A | 6/2000 | Weiss |
| 6,082,887 A | 7/2000 | Feuer et al. |
| 6,089,976 A | 7/2000 | Schneider et al. |
| 6,089,977 A | 7/2000 | Bennett |
| 6,089,978 A | 7/2000 | Adams |
| 6,089,980 A | 7/2000 | Gauselmann |
| 6,093,102 A | 7/2000 | Bennett |
| 6,102,400 A | 8/2000 | Scott et al. |
| 6,102,798 A | 8/2000 | Bennett |
| 6,110,043 A | 8/2000 | Olsen |
| 6,113,098 A | 9/2000 | Adams |
| 6,117,009 A | 9/2000 | Yoseloff |
| 6,120,031 A | 9/2000 | Adams |
| 6,120,377 A | 9/2000 | McGinnis, Sr. et al. |
| 6,123,335 A | 9/2000 | Adkins |
| 6,126,542 A | 10/2000 | Fier |
| 6,126,547 A | 10/2000 | Ishimoto |
| 6,134,556 A | 10/2000 | Shin |
| 6,135,884 A | 10/2000 | Hendrick et al. |
| 6,135,885 A | 10/2000 | Lermusiaux |
| 6,142,872 A | 11/2000 | Walker et al. |
| 6,142,873 A | 11/2000 | Weiss et al. |
| 6,146,273 A | 11/2000 | Olsen |
| 6,149,521 A | 11/2000 | Sanduski |
| 6,155,925 A | 12/2000 | Giobbi et al. |
| 6,159,095 A | 12/2000 | Frohm et al. |
| 6,159,097 A | 12/2000 | Gura |
| 6,159,098 A | 12/2000 | Slomiany et al. |
| 6,162,121 A | 12/2000 | Morro et al. |
| 6,164,652 A | 12/2000 | Lauretta et al. |
| 6,165,071 A | 12/2000 | Weiss |
| 6,165,072 A | 12/2000 | Davis et al. |
| 6,168,520 B1 | 1/2001 | Baerlocher et al. |
| 6,168,521 B1 | 1/2001 | Luciano, Jr. |
| 6,168,523 B1 | 1/2001 | Piechowiak et al. |
| 6,173,955 B1 | 1/2001 | Perrie et al. |
| 6,174,235 B1 | 1/2001 | Walker et al. |
| 6,186,894 B1 | 2/2001 | Mayeroff |
| 6,190,255 B1 | 2/2001 | Thomas et al. |
| 6,203,010 B1 | 3/2001 | Jorasch et al. |
| 6,203,429 B1 | 3/2001 | Demar et al. |
| 6,206,782 B1 | 3/2001 | Walker et al. |
| 6,210,275 B1 | 4/2001 | Olsen |
| 6,210,277 B1 | 4/2001 | Stefan |
| 6,213,876 B1 | 4/2001 | Moore, Jr. |
| 6,224,482 B1 | 5/2001 | Bennett |
| 6,224,483 B1 | 5/2001 | Mayeroff |
| 6,224,484 B1 | 5/2001 | Okuda et al. |
| 6,224,486 B1 | 5/2001 | Walker et al. |
| 6,231,442 B1 | 5/2001 | Mayeroff |
| 6,231,445 B1 | 5/2001 | Acres |
| 6,254,481 B1 | 7/2001 | Jaffe |
| 6,261,177 B1 | 7/2001 | Bennett |
| 6,270,409 B1 | 8/2001 | Shuster |
| 6,273,420 B1 | 8/2001 | Brooks |

| Patent No. | Date | Inventor |
|---|---|---|
| 6,287,202 B1 | 9/2001 | Pascal et al. |
| 6,290,600 B1 | 9/2001 | Glasson |
| 6,299,165 B1 | 10/2001 | Nagano |
| 6,309,299 B1 | 10/2001 | Weiss |
| 6,309,300 B1 | 10/2001 | Glavich |
| 6,309,307 B1 | 10/2001 | Krause et al. |
| 6,312,332 B1 | 11/2001 | Walker et al. |
| 6,312,334 B1 | 11/2001 | Yoseloff |
| 6,315,660 B1 | 11/2001 | DeMar et al. |
| 6,315,664 B1 | 11/2001 | Baerlocher et al. |
| 6,319,124 B1 | 11/2001 | Baerlocher et al. |
| 6,319,125 B1 | 11/2001 | Acres |
| 6,328,649 B1 | 12/2001 | Randall et al. |
| 6,338,678 B1 | 1/2002 | Seelig et al. |
| 6,346,043 B1 | 2/2002 | Collin et al. |
| 6,347,996 B1 | 2/2002 | Gilmore et al. |
| 6,364,767 B1 | 4/2002 | Brossard et al. |
| 6,368,216 B1 | 4/2002 | Hedrick et al. |
| 6,398,644 B1 | 6/2002 | Perrie et al. |
| 6,406,369 B1 | 6/2002 | Baerlocher et al. |
| 6,425,824 B1 | 7/2002 | Baerlocher et al. |
| 6,439,995 B1 | 8/2002 | Hughs-Baird et al. |
| 6,443,837 B1 | 9/2002 | Jaffe et al. |
| 6,450,883 B1 | 9/2002 | O'Halloran |
| 6,461,241 B1 | 10/2002 | Webb et al. |
| 6,494,785 B1 | 12/2002 | Gerrard et al. |
| 6,508,709 B1 | 1/2003 | Karmarkar |
| 6,511,375 B1 | 1/2003 | Kaminkow |
| 6,514,141 B1 | 2/2003 | Kaminkow et al. |
| 6,533,273 B2 | 3/2003 | Cole et al. |
| 6,558,254 B2 | 5/2003 | Baerlocher et al. |
| 6,572,469 B2 | 6/2003 | Klitsner et al. |
| 6,572,473 B1 | 6/2003 | Baerlocher |
| 6,582,307 B2 | 6/2003 | Webb |
| 6,589,117 B1 | 7/2003 | Moritome et al. |
| 6,592,457 B1 | 7/2003 | Frohm et al. |
| 6,595,854 B2 | 7/2003 | Hughs-Baird et al. |
| 6,599,185 B1 | 7/2003 | Kaminkow et al. |
| 6,599,190 B2 | 7/2003 | Osawa |
| 6,599,193 B2 | 7/2003 | Baerlocher et al. |
| 6,602,136 B1 | 8/2003 | Baerlocher et al. |
| 6,602,137 B2 | 8/2003 | Kaminkow et al. |
| 6,605,001 B1 | 8/2003 | Tarantino |
| 6,607,438 B2 | 8/2003 | Baerlocher et al. |
| 6,612,574 B1 | 9/2003 | Cole et al. |
| 6,612,575 B1 | 9/2003 | Cole et al. |
| 6,632,139 B1 | 10/2003 | Baerlocher |
| 6,632,141 B2 | 10/2003 | Webb et al. |
| 6,638,164 B2 | 10/2003 | Randall et al. |
| 6,644,664 B2 | 11/2003 | Muir et al. |
| 6,645,071 B2 | 11/2003 | Perrie et al. |
| 6,652,378 B2 | 11/2003 | Cannon et al. |
| 6,656,040 B1 | 12/2003 | Brossman et al. |
| 6,676,516 B2 | 1/2004 | Baerlocher et al. |
| 6,676,521 B1 | 1/2004 | La Mura et al. |
| 6,688,975 B2 | 2/2004 | Baerlocher et al. |
| 6,688,977 B1 | 2/2004 | Baerlocher et al. |
| 6,692,356 B2 | 2/2004 | Baerlocher et al. |
| 6,722,976 B2 | 4/2004 | Adams |
| 6,722,981 B2 | 4/2004 | Kaminkow et al. |
| 6,722,982 B2 | 4/2004 | Kaminkow et al. |
| 6,722,983 B2 | 4/2004 | Kaminkow et al. |
| 6,726,565 B2 | 4/2004 | Hughs-Baird |
| 6,733,386 B2 | 5/2004 | Cuddy et al. |
| 6,743,096 B2 | 6/2004 | Allendorf et al. |
| 6,749,504 B2 | 6/2004 | Hughs-Baird |
| 6,758,747 B2 | 7/2004 | Baerlocher |
| 6,769,983 B2 | 8/2004 | Slomiany |
| 6,780,107 B2 | 8/2004 | Baerlocher et al. |
| 6,780,110 B2 | 8/2004 | Baerlocher et al. |
| 6,780,111 B2 | 8/2004 | Cannon et al. |
| 6,783,457 B2 | 8/2004 | Hughs-Baird et al. |
| 6,793,578 B2 | 9/2004 | Luccesi et al. |
| 6,796,899 B2 | 9/2004 | Baerlocher et al. |
| 6,800,026 B2 | 10/2004 | Cannon |
| 6,814,664 B2 | 11/2004 | Baerlocher et al. |
| 6,817,944 B2 | 11/2004 | Kaminkow et al. |
| 6,837,793 B2 | 1/2005 | McClintic |
| 6,840,856 B2 | 1/2005 | Stern |
| 6,843,722 B2 | 1/2005 | Webb |
| 6,863,606 B2 | 3/2005 | Berg et al. |
| 6,866,584 B2 | 3/2005 | Michaelson |
| 6,875,108 B1 | 4/2005 | Hughs-Baird |
| 6,880,168 B2 | 4/2005 | Maehiro |
| 6,887,154 B1 | 5/2005 | Luciano, Jr. et al. |
| 6,890,255 B2 | 5/2005 | Jarvis et al. |
| 6,899,620 B2 | 5/2005 | Kaminkown et al. |
| 6,902,478 B2 | 6/2005 | McClintic |
| 6,905,406 B2 | 6/2005 | Kaminkow et al. |
| 6,913,533 B2 | 7/2005 | Cuddy et al. |
| 6,918,830 B2 | 7/2005 | Baerlocher |
| 6,932,701 B2 | 8/2005 | Glavich et al. |
| 6,939,224 B2 | 9/2005 | Palmer et al. |
| 6,958,013 B2 | 10/2005 | Miereau et al. |
| 6,966,833 B2 | 11/2005 | Kaminkow et al. |
| 6,966,834 B1 | 11/2005 | Johnson |
| 6,971,954 B2 | 12/2005 | Randall et al. |
| 6,988,946 B2 | 1/2006 | Michaleson |
| 6,988,948 B1 | 1/2006 | Perrie et al. |
| 6,995,751 B2 | 2/2006 | Falvo |
| 6,996,833 B1 | 2/2006 | Olson et al. |
| 7,011,581 B2 | 3/2006 | Cole et al. |
| 7,029,395 B1 | 4/2006 | Baerlocher |
| 7,037,191 B2 | 5/2006 | Rodgers et al. |
| 7,037,192 B2 | 5/2006 | Baerlocher et al. |
| 7,040,984 B2 | 5/2006 | Mead |
| 7,056,214 B2 | 6/2006 | Miereau et al. |
| 7,077,744 B2 | 7/2006 | Cannon |
| 7,081,050 B2 | 7/2006 | Tarantino |
| 7,104,888 B2 | 9/2006 | Miereau et al. |
| 7,112,137 B2 | 9/2006 | Baerlocher et al. |
| 7,121,942 B2 | 10/2006 | Baerlocher |
| 7,158,798 B2 | 1/2007 | Lee et al. |
| 7,160,186 B2 | 1/2007 | Cuddy et al. |
| 7,160,188 B2 | 1/2007 | Kaminkow et al. |
| 7,160,190 B2 | 1/2007 | Baerlocher et al. |
| 7,169,041 B2 | 1/2007 | Tessmer et al. |
| 7,169,042 B2 | 1/2007 | Muir et al. |
| 7,169,044 B2 | 1/2007 | Baerlocher et al. |
| 7,172,506 B2 | 2/2007 | Baerlocher et al. |
| 7,175,523 B2 | 2/2007 | Gilmore et al. |
| 7,182,689 B2 | 2/2007 | Hughs-Baird et al. |
| 7,192,348 B2 | 3/2007 | Brosnan |
| 7,198,570 B2 | 4/2007 | Rodgers et al. |
| 7,201,657 B2 | 4/2007 | Baerlocher et al. |
| 7,223,172 B2 | 5/2007 | Baerlocher et al. |
| 7,235,011 B2 | 6/2007 | Randall et al. |
| 7,240,093 B1 | 7/2007 | Danieli et al. |
| 7,257,714 B1 | 8/2007 | Shen |
| 7,264,545 B2 | 9/2007 | Maya et al. |
| 7,291,069 B2 | 11/2007 | Michaelson et al. |
| 7,300,348 B2 | 11/2007 | Kaminkow et al. |
| 7,303,469 B2 | 12/2007 | Kaminkow et al. |
| 7,311,598 B2 | 12/2007 | Kaminkow et al. |
| 7,311,604 B2 | 12/2007 | Kaminkow et al. |
| 7,311,608 B1 | 12/2007 | Danieli et al. |
| 7,314,408 B2 | 1/2008 | Cannon |
| 7,314,409 B2 | 1/2008 | Maya et al. |
| 7,314,410 B2 | 1/2008 | Baerlocher et al. |
| 7,318,773 B2 | 1/2008 | Baerlocher |
| 7,326,115 B2 | 2/2008 | Baerlocher |
| 7,331,865 B2 | 2/2008 | Baerlocher et al. |
| 7,338,367 B2 | 3/2008 | Kaminkow et al. |
| 7,338,369 B2 | 3/2008 | Mierau et al. |
| 7,351,140 B2 | 4/2008 | Wolf et al. |
| 7,361,087 B2 | 4/2008 | Baerlocher et al. |
| 7,393,280 B2 | 7/2008 | Cannon |
| 7,422,213 B2 | 9/2008 | Katz et al. |
| 7,427,236 B2 | 9/2008 | Kaminkow et al. |
| 7,448,949 B2 | 11/2008 | Kaminkow et al. |
| 8,187,068 B2 * | 5/2012 | Slomiany et al. ............ 463/9 |
| 2001/0004607 A1 | 6/2001 | Olsen |
| 2001/0016513 A1 | 8/2001 | Muir et al. |
| 2002/0016200 A1 | 2/2002 | Baerlocher et al. |
| 2002/0039923 A1 | 4/2002 | Cannon et al. |
| 2002/0052232 A1 | 5/2002 | Kaminkow |
| 2002/0055381 A1 | 5/2002 | Tarantino |
| 2002/0128055 A1 | 9/2002 | Adams |

| | | |
|---|---|---|
| 2002/0137560 A1 | 9/2002 | DeMar et al. |
| 2002/0177483 A1 | 11/2002 | Cannon |
| 2003/0013514 A1 | 1/2003 | Cregan et al. |
| 2003/0036422 A1 | 2/2003 | Baerlocher et al. |
| 2003/0036424 A1 | 2/2003 | Baerlocher |
| 2003/0040358 A1 | 2/2003 | Rothkranz et al. |
| 2003/0054871 A1 | 3/2003 | Baerlocher |
| 2003/0060259 A1 | 3/2003 | Mierau et al. |
| 2003/0060264 A1 | 3/2003 | Chilton et al. |
| 2003/0064773 A1 | 4/2003 | Baerlocher et al. |
| 2003/0064779 A1 | 4/2003 | Suda |
| 2003/0064796 A1 | 4/2003 | Glavich et al. |
| 2003/0069057 A1 | 4/2003 | DeFrees-Parrott |
| 2003/0078091 A1 | 4/2003 | Brandstetter et al. |
| 2003/0078096 A1 | 4/2003 | Kaminkow et al. |
| 2003/0104853 A1 | 6/2003 | Tessmer et al. |
| 2003/0114220 A1 | 6/2003 | McClintic |
| 2003/0119581 A1 | 6/2003 | Cannon et al. |
| 2003/0125107 A1 | 7/2003 | Cannon |
| 2003/0127793 A1 | 7/2003 | Adams |
| 2003/0153378 A1 | 8/2003 | Schlegel et al. |
| 2003/0157982 A1 | 8/2003 | Gerrard et al. |
| 2003/0162578 A1 | 8/2003 | Baerlocher et al. |
| 2004/0033831 A1 | 2/2004 | Tarantino |
| 2004/0048644 A1 | 3/2004 | Gerrard et al. |
| 2004/0048649 A1 | 3/2004 | Peterson et al. |
| 2004/0053665 A1 | 3/2004 | Baerlocher |
| 2004/0082373 A1 | 4/2004 | Cole et al. |
| 2004/0111358 A1 | 6/2004 | Lange et al. |
| 2004/0152520 A1 | 8/2004 | Shinoda |
| 2004/0166923 A1 | 8/2004 | Michaelson et al. |
| 2004/0224770 A1 | 11/2004 | Wolf et al. |
| 2004/0229671 A1 | 11/2004 | Stronach et al. |
| 2004/0242315 A1 | 12/2004 | Paulsen et al. |
| 2004/0248639 A1 | 12/2004 | Slomiany |
| 2005/0020340 A1 | 1/2005 | Cannon |
| 2005/0020351 A1 | 1/2005 | Baerlocher et al. |
| 2005/0020352 A1 | 1/2005 | Chilton et al. |
| 2005/0026679 A1 | 2/2005 | Lucchesi et al. |
| 2005/0026687 A1 | 2/2005 | Watanabe |
| 2005/0033461 A1 | 2/2005 | Gerrard et al. |
| 2005/0054404 A1 | 3/2005 | Baerlocher |
| 2005/0054405 A1 | 3/2005 | Baerlocher et al. |
| 2005/0054415 A1 | 3/2005 | Kaminkow et al. |
| 2005/0054416 A1 | 3/2005 | Hostetler et al. |
| 2005/0054435 A1 | 3/2005 | Rodgers et al. |
| 2005/0059456 A1 | 3/2005 | Mead et al. |
| 2005/0059461 A1 | 3/2005 | Ching et al. |
| 2005/0064928 A1 | 3/2005 | Baerlocher et al. |
| 2005/0096123 A1 | 5/2005 | Cregan et al. |
| 2005/0101372 A1 | 5/2005 | Mierau et al. |
| 2005/0137014 A1 | 6/2005 | Vetelainen |
| 2005/0181860 A1 | 8/2005 | Nguyen et al. |
| 2005/0192081 A1 | 9/2005 | Marks et al. |
| 2005/0197180 A1 | 9/2005 | Kaminkow et al. |
| 2005/0202875 A1 | 9/2005 | Murphy et al. |
| 2005/0218591 A1 | 10/2005 | Torigian et al. |
| 2005/0227754 A1 | 10/2005 | Kaminkow et al. |
| 2006/0025195 A1 | 2/2006 | Pennington et al. |
| 2006/0030401 A1 | 2/2006 | Mead et al. |
| 2006/0030959 A1 | 2/2006 | Duhamel |
| 2006/0035696 A1 | 2/2006 | Walker et al. |
| 2006/0040732 A1 | 2/2006 | Baerlocher et al. |
| 2006/0046821 A1 | 3/2006 | Kaminkow et al. |
| 2006/0046822 A1 | 3/2006 | Kaminkow et al. |
| 2006/0068882 A1 | 3/2006 | Baerlocher et al. |
| 2006/0068893 A1 | 3/2006 | Jaffe et al. |
| 2006/0073874 A1 | 4/2006 | Cregan et al. |
| 2006/0079317 A1 | 4/2006 | Flemming et al. |
| 2006/0084500 A1 | 4/2006 | Baerlocher et al. |
| 2006/0089194 A1 | 4/2006 | Joshi et al. |
| 2006/0121971 A1 | 6/2006 | Slomiany et al. |
| 2006/0157934 A1 | 7/2006 | Yoseloff et al. |
| 2006/0183528 A1 | 8/2006 | Rodgers et al. |
| 2006/0199628 A1 | 9/2006 | Rodgers et al. |
| 2006/0217170 A1 | 9/2006 | Roireau |
| 2006/0217183 A1 | 9/2006 | Mierau et al. |
| 2006/0246977 A1 | 11/2006 | Cannon |
| 2006/0247011 A1 | 11/2006 | Gagner |
| 2006/0287057 A1 | 12/2006 | Osawa |
| 2007/0015566 A1 | 1/2007 | Baerlocher et al. |
| 2007/0015572 A1 | 1/2007 | Baerlocher |
| 2007/0015585 A1 | 1/2007 | Sartini |
| 2007/0032285 A1 | 2/2007 | Wolf |
| 2007/0054732 A1 | 3/2007 | Baerlocher |
| 2007/0054733 A1 | 3/2007 | Baerlocher |
| 2007/0060271 A1 | 3/2007 | Cregan et al. |
| 2007/0060292 A1 | 3/2007 | Peterson |
| 2007/0060300 A1 | 3/2007 | Baerlocher |
| 2007/0077990 A1 | 4/2007 | Cuddy et al. |
| 2007/0077997 A1 | 4/2007 | Johnson |
| 2007/0087809 A1 | 4/2007 | Baerlocher |
| 2007/0105620 A1 | 5/2007 | Cuddy et al. |
| 2007/0111783 A1 | 5/2007 | Cuddy et al. |
| 2007/0117606 A1 | 5/2007 | Baerlocher et al. |
| 2007/0117608 A1 | 5/2007 | Roper et al. |
| 2007/0123353 A1 | 5/2007 | Smith |
| 2007/0129131 A1 | 6/2007 | Kaminkow et al. |
| 2007/0149269 A1 | 6/2007 | Benbrahim |
| 2007/0155485 A1 | 7/2007 | Cuddy et al. |
| 2007/0167211 A1 | 7/2007 | Rodgers et al. |
| 2007/0167217 A1 | 7/2007 | Kaminkow et al. |
| 2007/0173325 A1 | 7/2007 | Shaw et al. |
| 2007/0184896 A1 | 8/2007 | Dickerson |
| 2007/0218997 A1 | 9/2007 | Cho |
| 2007/0243936 A1 | 10/2007 | Binenstock et al. |
| 2007/0259713 A1 | 11/2007 | Fiden et al. |
| 2007/0265060 A1 | 11/2007 | Hornik et al. |
| 2007/0281775 A1 | 12/2007 | Kashima |
| 2007/0298858 A1 | 12/2007 | Toneguzzo |
| 2007/0298874 A1 | 12/2007 | Baerlocher et al. |
| 2007/0298875 A1 | 12/2007 | Baerlocher et al. |
| 2008/0004102 A1 | 1/2008 | Kojima |
| 2008/0020822 A1 | 1/2008 | Cuddy et al. |
| 2008/0020846 A1 | 1/2008 | Vasquez |
| 2008/0064502 A1 | 3/2008 | Schlottmann et al. |
| 2008/0076514 A1 | 3/2008 | Baerlocher et al. |
| 2008/0076515 A1 | 3/2008 | Baerlocher et al. |
| 2008/0076517 A1 | 3/2008 | Baerlocher et al. |
| 2008/0076552 A1 | 3/2008 | Baerlocher et al. |
| 2008/0102916 A1 | 5/2008 | Kovacs et al. |
| 2008/0108404 A1 | 5/2008 | Iddings et al. |
| 2008/0108429 A1 | 5/2008 | Davis et al. |
| 2008/0113735 A1 | 5/2008 | Maya |
| 2008/0146322 A1 | 6/2008 | Hardy et al. |
| 2008/0146323 A1 | 6/2008 | Hardy et al. |
| 2008/0146345 A1 | 6/2008 | Hardy et al. |
| 2008/0167118 A1 | 7/2008 | Kroekel et al. |
| 2008/0176650 A1 | 7/2008 | Wolf et al. |
| 2008/0182662 A1 | 7/2008 | Yoshizawa |
| 2008/0214310 A1 | 9/2008 | Brunet De Courssou et al. |
| 2008/0227549 A1 | 9/2008 | Itskov et al. |
| 2008/0227552 A1 | 9/2008 | Shimomura et al. |
| 2008/0280670 A1 | 11/2008 | Sakuma |
| 2009/0124327 A1 | 5/2009 | Caputo et al. |
| 2009/0143136 A1 | 6/2009 | Thomas |
| 2010/0016065 A1 | 1/2010 | Nicely et al. |
| 2010/0029363 A1 | 2/2010 | Hoffman et al. |
| 2010/0048282 A1 | 2/2010 | Nicely et al. |
| 2010/0120505 A1 | 5/2010 | Caputo et al. |
| 2010/0120521 A1 | 5/2010 | Caputo et al. |
| 2011/0111818 A1 | 5/2011 | Baerlocher |
| 2011/0111827 A1 | 5/2011 | Nicely et al. |
| 2011/0201410 A1* | 8/2011 | Englman et al. ............. 463/25 |
| 2012/0108319 A1* | 5/2012 | Caputo et al. ............... 463/25 |
| 2012/0122550 A1* | 5/2012 | Johnson et al. ............. 463/22 |

FOREIGN PATENT DOCUMENTS

| | | |
|---|---|---|
| EP | 0688002 | 12/1995 |
| EP | 0874337 | 10/1998 |
| EP | 0926645 | 6/1999 |
| EP | 0944030 | 9/1999 |
| EP | 0945837 | 9/1999 |
| EP | 1063622 | 12/2000 |
| EP | 1199689 | 4/2002 |
| EP | 1298607 | 4/2003 |
| EP | 1531434 | 5/2005 |
| EP | 1764753 | 3/2007 |

| | | |
|---|---|---|
| EP | 1779908 | 5/2007 |
| GB | 2066991 | 7/1981 |
| GB | 2072395 | 9/1981 |
| GB | 2084371 | 4/1982 |
| GB | 2096376 | 10/1982 |
| GB | 2137392 | 10/1984 |
| GB | 2144644 | 3/1985 |
| GB | 2161008 | 1/1986 |
| GB | 2170938 | 8/1986 |
| GB | 2182186 | 5/1987 |
| GB | 2191030 | 12/1987 |
| GB | 2201821 | 9/1988 |
| GB | 2202984 | 10/1988 |
| GB | 2222712 | 3/1990 |
| GB | 2226436 | 6/1990 |
| GB | 2242300 | 9/1991 |
| GB | 2322217 | 8/1998 |
| GB | 2328311 | 2/1999 |
| GB | 2333880 | 8/1999 |
| WO | WO9800210 | 1/1998 |
| WO | WO0012186 | 3/2000 |
| WO | WO0020082 | 4/2000 |
| WO | WO0043087 | 7/2000 |
| WO | WO02096528 | 12/2002 |
| WO | WO03010725 | 2/2003 |
| WO | WO03026757 | 4/2003 |
| WO | WO03049053 | 6/2003 |
| WO | WO03083796 | 10/2003 |
| WO | WO2005110570 | 11/2005 |
| WO | WO2006063054 | 6/2006 |
| WO | WO2007011502 | 1/2007 |
| WO | WO2007030641 | 3/2007 |
| WO | WO2007030733 | 3/2007 |
| WO | WO2007030801 | 3/2007 |
| WO | WO2007087078 | 8/2007 |
| WO | WO2008022323 | 2/2008 |
| WO | WO2008027062 | 3/2008 |
| WO | WO2008109987 | 9/2008 |

OTHER PUBLICATIONS

Office Action for U.S. Appl. No. 13/247,012, dated Oct. 2, 2012.
Office Action for U.S. Appl. No. 13/246,968, dated Mar. 15, 2013.
Office Action for U.S. Appl. No. 13/247,012, dated Mar. 15, 2013.

\* cited by examiner

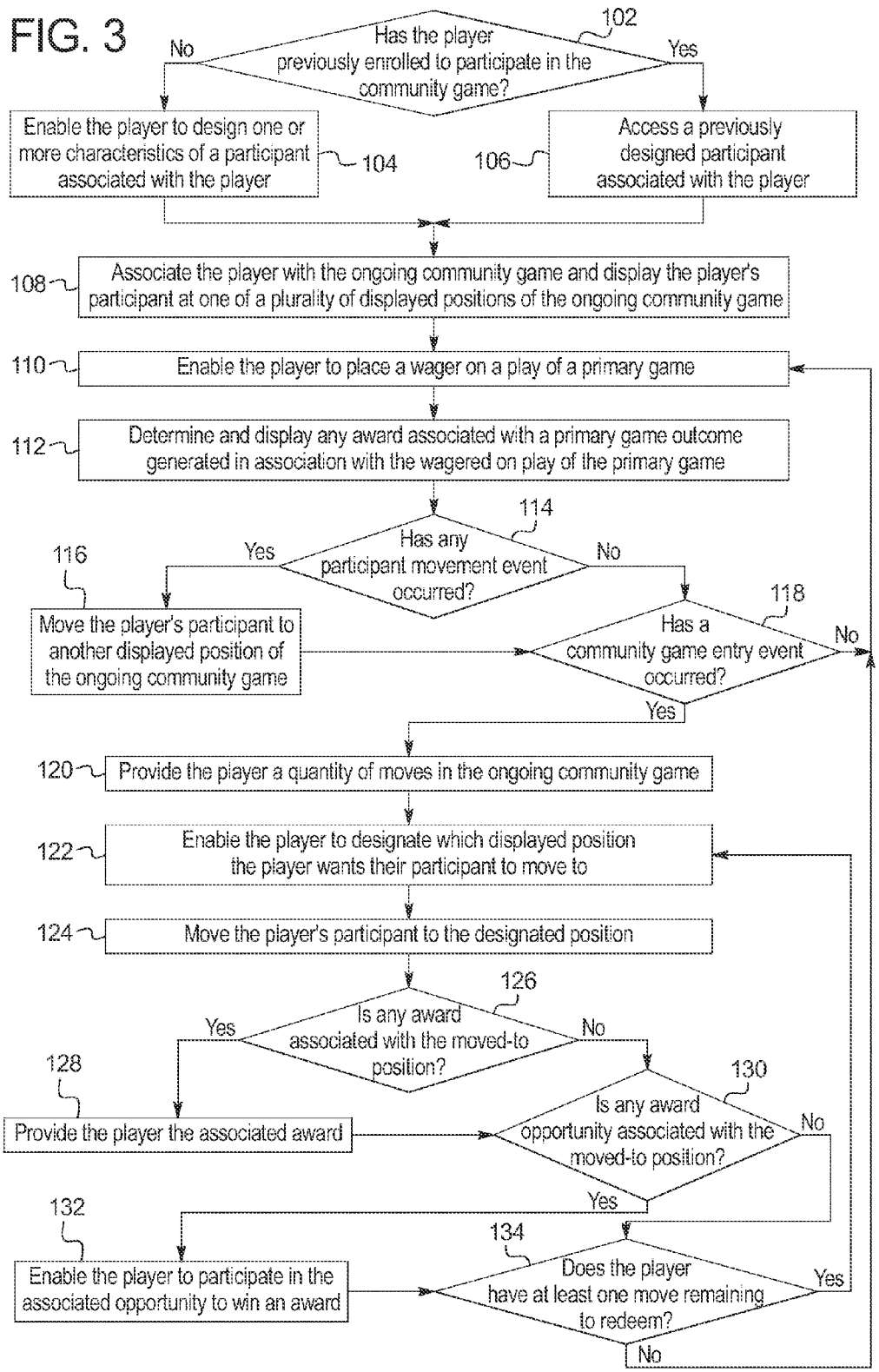

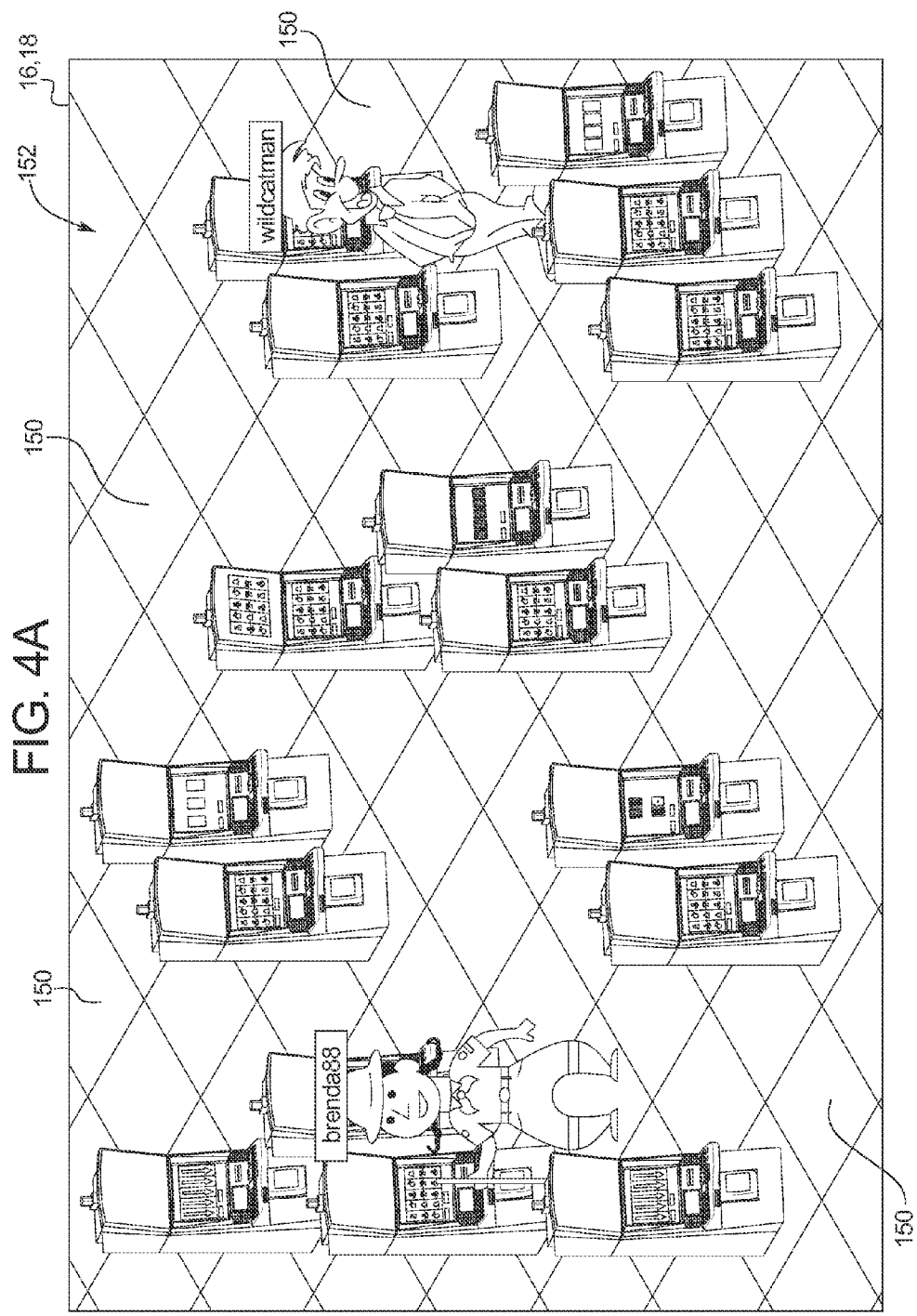

GAMING SYSTEM, GAMING DEVICE, AND METHOD FOR PROVIDING A MULTIPLE PLAYER PERSISTENT GAME

CROSS REFERENCE TO RELATED APPLICATIONS

This application relates to the following co-pending commonly owned patent applications: "GAMING SYSTEM, GAMING DEVICE, AND METHOD FOR PROVIDING A MULTIPLE PLAYER PERSISTENT GAME," Ser. No. 13/247,012, GAMING SYSTEM, GAMING DEVICE, AND METHOD FOR PROVIDING A MULTIPLE PLAYER PERSISTENT GAME," Ser. No. 13,247,036, and "GAMING SYSTEM, GAMING DEVICE, AND METHOD FOR PROVIDING A PERSISTENT GAME," Ser. No. 13/246,968.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Certain known gaming machines are configured such that the players of these gaming machines compete for one or more awards such as progressive awards. Such progressive awards are typically displayed by one or more secondary display devices above the bank or group of gaming machines. Other known gaming machines or gaming systems are configured such that the players share with each other or can each win one or more awards. These awards are sometimes displayed by one or more secondary display devices above the bank or group of gaming machines. These types of group or community gaming systems (where the players are either competing for awards, where the players are sharing awards, or where the players are winning awards at the same time) continue to grow in popularity. Certain of these group or community gaming systems create an aura of excitement and entertainment for the people playing the gaming machines of the system and for people watching play.

There is a continuing need to increase this excitement and entertainment for people playing and people watching play of group or community gaming systems. There is also need for new ways of providing better gaming experiences at gaming machines. There is a further need for increasing social interactivity among people playing and people watching play of gaming machines which are or are not part of a group or community gaming system.

SUMMARY

The present disclosure relates generally to gaming systems, gaming devices, and methods for providing a multiple player persistent game.

In various embodiments, the gaming system disclosed herein includes a multiple player persistent game, such as an ongoing community game associated with a plurality of gaming devices. This ongoing community game includes a community game area or matrix, such as a redemption area or redemption environment which is continuously displayed to at least each of the players of the gaming devices. The community game matrix includes a plurality of displayed positions, spots or spaces. A plurality or each of the displayed positions are associated with an award (e.g., a value or a modifier) or an award opportunity (e.g., a play of one of a plurality of different games). In operation, at least each of the players playing the primary games of the gaming devices of the gaming system are associated with a displayed participant or avatar that moves (randomly, in predetermined patterns, based on primary game outcomes and/or based on the player's control) to different displayed positions of the community game matrix. In one embodiment, if a player moves their associated participant to a displayed position that is associated with an award or an award opportunity, the gaming system provides the player any associated award or enables the player to participate in any associated award opportunity to potentially win an award. Such a gaming system provides players with an interactive, ongoing community game in which an individual player's decisions regarding which displayed positions to visit determine, at least in part, one or more individual awards provided to the player.

More specifically, the gaming system of one embodiment disclosed herein includes an ongoing community game having at least one redemption area. Each redemption area includes a plurality of positions. Certain of the displayed positions are associated with an award and/or an opportunity to win an award. These redemption areas and these positions are displayed to the players of the gaming devices (and the people watching the play of the community game) such that each player (or bystander) is aware or may become aware of any events currently occurring in the ongoing community game and/or any awards provided in association with the play of the ongoing community game.

In operation of this embodiment, each player (whether in a gaming establishment, online or elsewhere) playing a primary game at one of the gaming devices of the gaming system associated with the ongoing community game is associated with a participant or avatar. Each player's participant is initially displayed at one of the positions of the redemption area (i.e., a participant's starting position). While the player continues to play the primary games of one of the gaming devices (i.e., when the player is not actively controlling their participant in the community game), the player's participant remains in the redemption area and randomly moves to one or more different displayed positions. Such retainment of the player's participant in the redemption area provides that the redemption area remains populated with a plurality of participants which thus increases the level of excitement and enjoyment for players that are actively controlling their associated participants. In other words, because community games trigger relatively infrequently, simultaneously retaining different player's participants in the redemption area averts any low player liquidity (i.e., not enough players playing a single community game simultaneously) from occurring during any play of the community game disclosed herein. Moreover, such random movement of each player's participant facilitates that even when a player is not controlling their participant's movement throughout the redemption area, the player's participant remains moving throughout the redemption area and upon a player's entry or reentry to the ongoing community game, the player's participant may or may not be located at the participant's starting position and/or the last displayed position the player moved their participant to.

If a community game entry event occurs in association with a player playing the primary game of one of the gaming devices, the gaming system provides the player a quantity or number of moves or turns to redeem throughout the redemption area. Each provided move enables the player to access either the award/award opportunity at the player's participant's current position or the award/award opportunity at another position of the redemption area. This embodiment of providing a quantity of moves to utilize in the community game ensures that certain, quicker players are not given a distinct advantage over other players as in certain known community games which provide players an amount of time to move in the community game.

For each move provided to the player, the gaming system enables the player to designate where they want to move their participant (i.e., pick a destination position). Since the player is provided a limited quantity of moves, which displayed position the player's participant may move to is based, at least in part, on the participant's current position in the redemption area and the quantity of moves provided. After enabling the player to designate where they want to move, the gaming system moves the player's participant to the designated position and determines if any award or award opportunity is associated with the player's participant's moved-to position. If an award is associated with the player's participant's moved-to position, the gaming system provides the player the associated award. If an award opportunity is associated with the player's participant's moved-to position, the gaming system provides the player an opportunity to win an award, such as enabling the player to play one of a plurality of different games of different volatilities.

It should be appreciated that compared to certain known community games in which each of the player's play toward a community or common goal to win a group award, the ongoing community game disclosed herein enables each player to have an individual community game experience by enabling each player to play one or more individual games to determine an individual community game award for the player. It should be further appreciated that causing one or more displayed positions to be associated with different games of different volatilities provides an increased amount of entertainment for the player as each player of the community game is enabled to select, based on the player's decisions on where to move their participant, an amount of volatility of their community game experience.

In different embodiments, at a designated point in time, certain of the displayed positions of the redemption area are associated with modified awards (or an award opportunity having a modified average expected payout) compared to other points in time. For example, at designated points in time or in response to different events occurring, the awards associated with one or more adjacent displayed positions temporarily have an increased value and the award opportunities associated with one or more adjacent displayed positions temporarily have an increased average expected value. In these embodiments, the gaming system indicates to the players which displayed positions are temporarily associated with increased awards or increased average expected payouts (and which displayed positions are not associated with increased awards or increased average expected payouts). It should be appreciated that since the player's participant randomly moves throughout the redemption area while the player is playing one or more primary games, independent of any player input otherwise, the player's participant may randomly move to one or more displayed positions temporarily having an increased award (or an award opportunity with an increased average expected payout). Such a configuration provides that when the player enters and/or reenters the redemption area, the player's participant may be located closer to or further away from one or more displayed positions each having an increased award (or an award opportunity with an increased average expected payout).

In one such embodiment, if a community game entry event occurs in association with a player playing the primary game of one of the gaming devices, the gaming system enables the player to utilize any provided participant moves in the redemption area (as described above) or defer utilizing any provided participant moves until a subsequent point in time. That is, the gaming system enables a player to save entries into the ongoing community game (i.e., save participant moves in the redemption area) and selectively enter the ongoing community game (i.e., selectively utilize any accumulated participant moves in the redemption area). In this embodiment, because the gaming system indicates to the players which displayed positions are temporarily associated with increased awards or increased average expected payouts, a player with at least one saved entry may redeem a saved entry and utilize one or more saved participant moves in the redemption area when the player's participant has randomly moved to or near one or more displayed positions temporality having an increased award (or an award opportunity with an increased average expected payout) and/or the gaming system indicates that one or more displayed positions located at or near the player's participant's current position are temporarily associated with increased awards or award opportunities having increased average expected payouts. Such an embodiment provides an increased level of excitement and entertainment as player's must decide whether to currently redeem their entry into the community game or wait to redeem their entry into the community game when the conditions for winning an award could be more or less favorable for the player.

The gaming system disclosed herein can be implemented in a networked environment, such as over the Internet. In an Internet embodiment, the gaming system disclosed herein is implemented using one or more servers, and individual users that access the servers (and participate in the ongoing community game) by logging on from a personal web browser. In one such embodiment, while in a physical gaming establishment, a player's participant moves throughout one or more redemption areas obtaining zero, one or more community awards for the player. In this embodiment, when the player is subsequently remote from the physical gaming establishment and accesses the ongoing community game, the player's participant remains moving throughout one or more of the redemption areas. Thus, when the player returns to the physical gaming establishment, the player's participant may be located at a different position (from the player's last visit to the physical gaming establishment) which may be closer to or further away from one or more displayed positions having one or more lucrative awards or award opportunities.

The gaming system and method of the present disclosure thus provides an ongoing community game in which each player is provided individual awards or plays individual games to determine any individual awards for that player. The gaming system and method of the present disclosure further provides an ongoing community game in which a player's participant remains actively moving throughout the redemption area even if the player is not actively controlling the participant's movements. Such non-player controlled movements provides that the awards available for the player to win for that specific entrance into the community game are based on when the player enters the community game (either based on the player's decision or automatically upon an occurrence of a community game entry event) as well as where the player's participant is located when the player enters the community game.

Additional features and advantages are described in, and will be apparent from, the following Detailed Description and the figures.

BRIEF DESCRIPTION OF THE FIGURES

FIG. 3 is a flow chart an example process for operating a gaming system providing the ongoing community game disclosed herein.

FIG. 4A is a front view of one embodiment of the gaming system disclosed herein illustrating a plurality of displayed positions of a redemption area of an ongoing community game.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
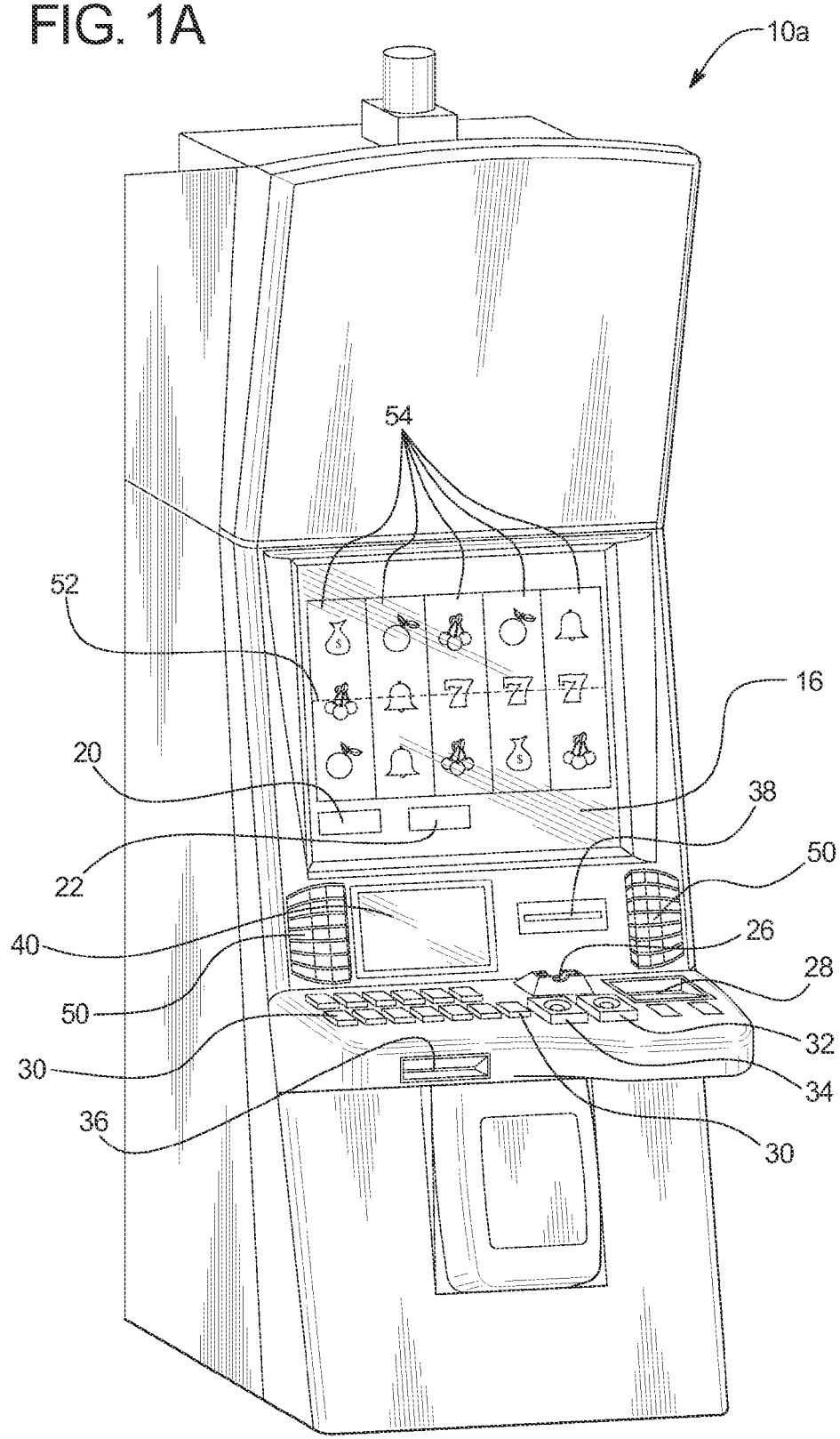
FIGS. 1A and 1B are perspective views of example alternative embodiments of the gaming device of the present disclosure.
Figure 1B:
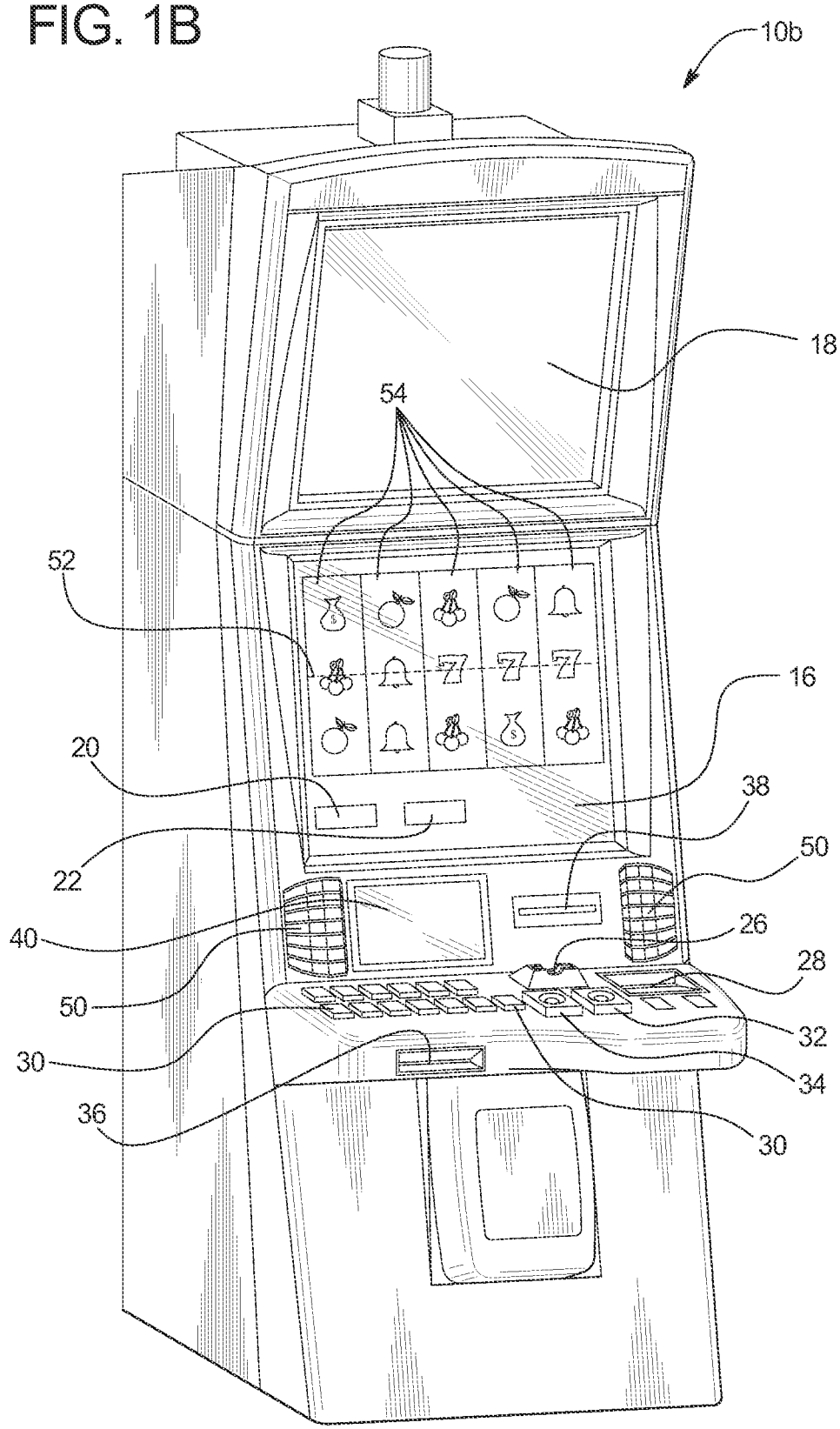

Referring now to the drawings, two example alternative embodiments of a gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
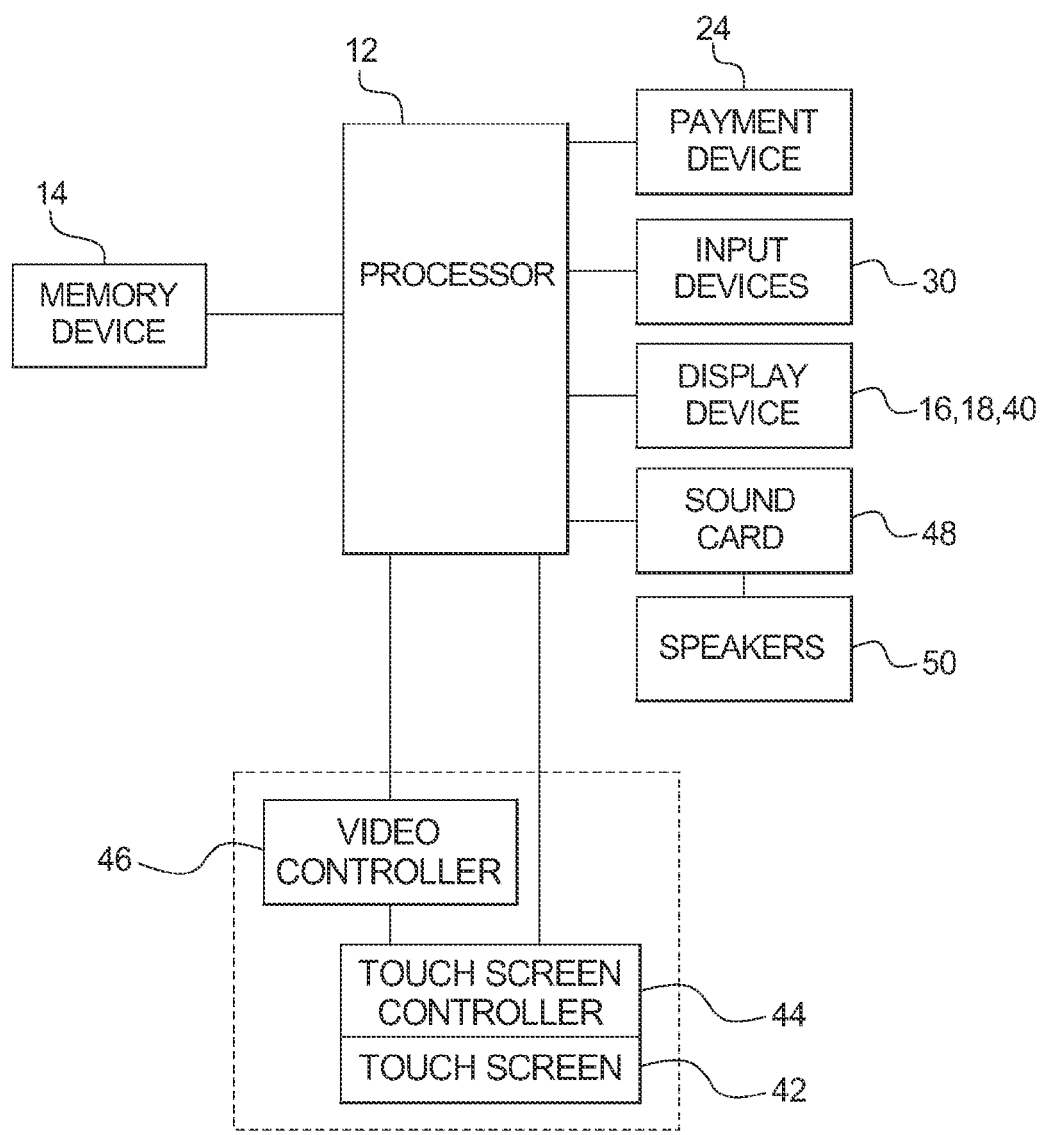
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a hand-held device, such as a personal digital assistant (PDA), a portable computing or mobile device, or another computerized platform to implement the present disclosure. In one embodiment, the gaming device or gaming machine disclosed herein is operable over a wireless network, for example as part of a wireless gaming system. In one such embodiment, the gaming machine may be a hand-held device, a mobile device, or any other suitable wireless device that enables a player to play any suitable game at a variety of different locations. In various embodiments in which the gaming device or gaming machine is a hand-held device, a mobile device, or any other suitable wireless device, at least one memory device and at least one processor which control the game or other operations of the hand-held device, mobile device, or other suitable wireless device may be located: (a) at the hand-held device, mobile device or other suitable wireless device; (b) at a central server or central controller; or (c) any suitable combination of the central server or central controller and the hand-held device, mobile device or other suitable wireless device. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented. In one embodiment, the disclosed multi-dimensional cascading symbol game is implemented as a base or primary game.

In one embodiment, as illustrated in FIGS. 1A and 1B, a base or primary game may be a slot game with one or more paylines 52. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player.

In one embodiment, one or more of the paylines may be horizontal, vertical, circular, diagonal, angled or any combination thereof. In another embodiment, one or more of the paylines each include a plurality of adjacent symbol display positions on a requisite number of adjacent reels. In one such embodiment, one or more paylines are formed between at least two symbol display positions which are adjacent to each other by either sharing a common side or sharing a common corner (i.e., such paylines are connected paylines). In these embodiments, the gaming device enables a player to wager on one or more of such paylines to activate such wagered on paylines.

In another embodiment wherein one or more paylines are formed between at least two symbol display positions which are adjacent to each other, the gaming device enables a player to wager on and thus activate a plurality of symbol display positions. In this embodiment, one or more paylines which are formed from a plurality of adjacent active symbol display positions on a requisite number of adjacent reels are activated.

In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol display positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol display positions on a first reel by the number of symbols generated in active symbol display positions on a second reel by the number of symbols generated in active symbol display positions on a third reel and so on for each reel of the gaming device with at least one symbol generated in an active symbol display position. For example, a three reel gaming device with three symbols generated in active symbol display positions on each reel includes 27 ways to win (i.e., 3 symbols on the first reel×3 symbols on the second reel×3 symbols on the third reel). A four reel gaming device with three symbols generated in active symbol display positions on each reel includes 81 ways to win (i.e., 3 symbols on the first reel×3 symbols on the second reel×3 symbols on the third reel×3 symbols on the fourth reel). A five reel gaming device with three symbols generated in active symbol display positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol display positions by one or more of the reels modifies the number of ways to win.

In another embodiment, the gaming device enables a player to wager on and thus activate symbol display positions. In one such embodiment, the symbol display positions are on the reels. In this embodiment, if based on the player's wager, a reel is activated, then each of the symbol display positions of that reel will be activated and each of the active symbol display positions will be part of one or more of the ways to win. In one embodiment, if based on the player's wager, a reel is not activated, then a designated number of default symbol display positions, such as a single symbol display position of the middle row of the reel, will be activated and the default symbol display position(s) will be part of one or more of the ways to win. This type of gaming machine enables a player to wager on one, more than one or all of the reels and the processor of the gaming device uses the number of wagered on reels to determine the active symbol display positions and the number of possible ways to win. In alternative embodiments, (1) no symbols are displayed as generated at any of the inactive symbol display positions, or (2) any symbols generated at any inactive symbol display positions may be displayed to the player but suitably shaded or otherwise designated as inactive.

In one embodiment wherein a player wagers on one or more reels, a player's wager of one credit may activate each of the three symbol display positions on a first reel, wherein one default symbol display position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol display positions on a first reel, each of the three symbol display positions on a second reel and each of the three symbol display positions on a third reel wherein one default symbol display position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol display position on a first reel forms part of a winning symbol combination with or is otherwise suitably related to a symbol generated in an active symbol display position on a second reel. In this embodiment, the gaming device classifies each pair of symbols which form part of a winning symbol combination (i.e., each pair of related symbols) as a string of related symbols. For example, if active symbol display positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol display positions (i.e., as opposed to a quantity of awards being based on how many paylines that would have passed through each of the strings of related symbols in active symbol display positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. In one embodiment, the disclosed multi-dimensional cascading symbol game is implemented as a bonus or secondary game. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
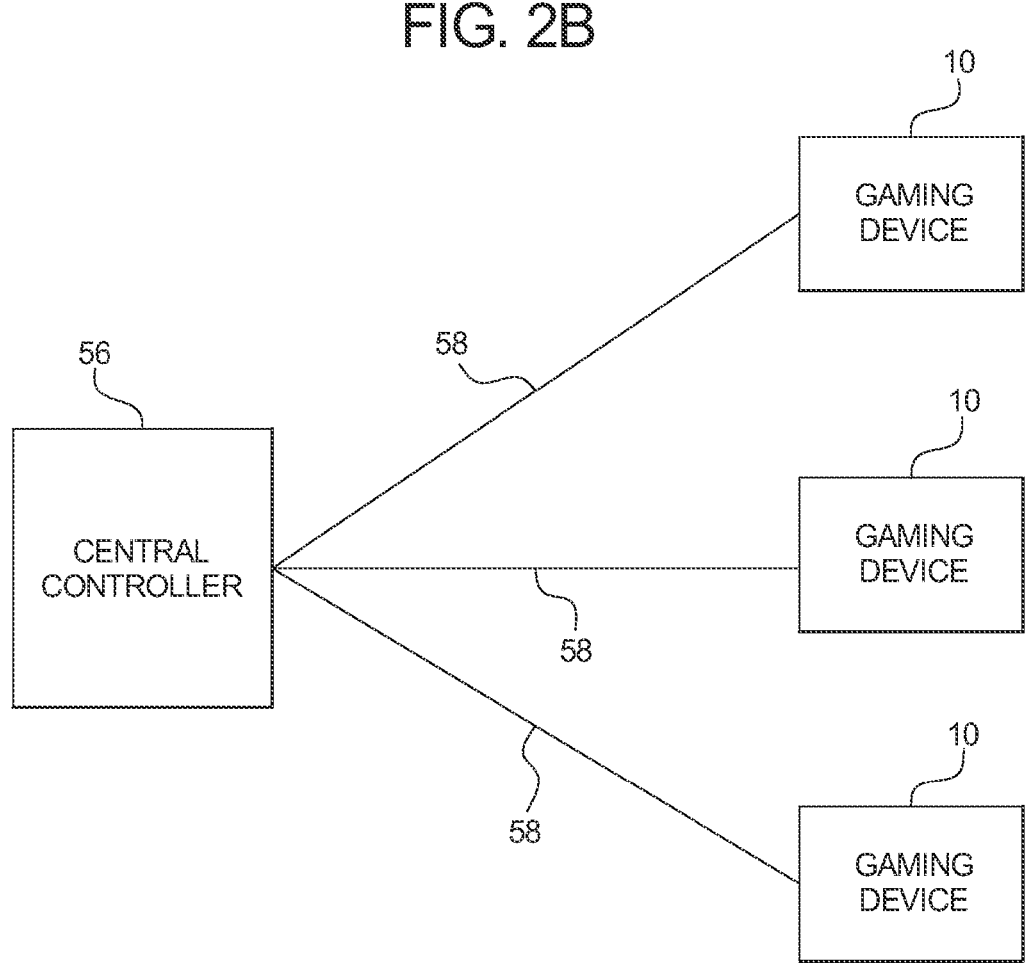
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiple Player Persistent Bonus Game

Referring now to FIG. 3, a flowchart of an example embodiment of a process for operating a gaming system or a gaming device disclosed herein is illustrated. In one embodiment, this process is embodied in one or more software programs stored in one or more memories and executed by one or more processors or servers. Although this process is described with reference to the flowchart illustrated in FIG. 3, it should be appreciated that many other methods of performing the acts associated with this process may be used. For example, the order of certain steps described may be changed, or certain steps described may be optional.

As seen in FIG. 3, in one embodiment, when a community game enrollment event occurs, the gaming system determines whether the player has previously enrolled to participate in the community game as indicated in diamond 102. In one such embodiment, a community game enrollment event occurs when a player submits (such as inserting) a player tracking card or inputs other identification into the gaming device. In another such embodiment, a community game enrollment event occurs when an unidentified player places a wager on a play of a primary game. In another such embodiment, a community game enrollment event occurs when a player begins play at a dedicated account based gaming machine that is configured to play with a specific player.

In one embodiment, if the player has not previously enrolled to participate in the community game, the gaming system enables the player to design or select one or more characteristics or icons of a participant (e.g., an avatar) associated with that player as indicated in block 104. For example, in designing a participant, the gaming system enables the player to select one or more of a gender, clothing, body characteristics or features, facial characteristics or features, and/or celebration sounds or catch-phrases. On the other hand, if the player has previously enrolled to participate in the community game, the gaming system accesses a previously designed participant associated with the player as indicated in block 106. In one such embodiment, if the player has obtained any virtual goods (from purchasing such virtual goods and/or winnings such virtual goods in association with one or more plays of one or more primary games and/or bonus games), the gaming system enables the player to modify their existing designed participant with such virtual goods.

After designing a participant for the player or accessing a previously designed participant for the player, the gaming system associates the player with the ongoing community game and displays or presents the player's participant at one of a plurality of positions of the ongoing community game as indicated in block 108. It should be appreciated that this display of the player's participant at one of the positions of the community game occurs prior to the community game entry event occurring and prior to the player selectively entering the community game. That is, even before the player has gained entry to play the ongoing community game, the player's participant is actively involved in the ongoing community game.

In one embodiment, as seen in FIG. 4A, the ongoing community game includes a plurality of positions 150 which form part or all of at least one redemption area 152. In one embodiment, one or more of the displayed positions are each associated with a community game award, such as an award value or an award multiplier. In this embodiment, one or more of the displayed positions are each associated with a community game award opportunity, such as a play of a slot game or a play of a selection game. As seen in FIG. 4A, each community game award opportunity is displayed to the player as a different gaming device 154 which the player may move their participant to play.

In one embodiment, the gaming system causes at least one display device of the player's gaming device to display the ongoing community game. In another embodiment, in addition or in alternative to each gaming device displaying the ongoing community game, the gaming system causes one or more community or overhead display devices to display part or all of the community game to one or more other players or bystanders either at a gaming establishment or viewing over a network, such as the internet. In another embodiment, in addition or in alternative to each gaming device displaying the ongoing community game, the gaming system causes one or more internet sites to each display the ongoing community game such that a player is enabled to log on from a personal web browser to view at least their participant's location in the redemption area. In another such embodiment, the gaming system enables the player to play one or more primary games on one device while viewing the ongoing community game from another device. For example, the gaming system enables the player to play one or more primary games on a mobile phone while viewing the status of the ongoing community game on a PC desktop or laptop computer. In this example, the gaming system enables the player to control their participant from the mobile phone if a community game entry event occurs. In one such example, the gaming system enables the player to navigate their participant over a smaller complete version of the redemption area displayed on the mobile phone. In another such example, the gaming system enables the player to only view a portion of the redemption area on the mobile phone while simultaneously viewing the entire redemption area on the PC desktop or laptop computer.

In one embodiment, if the player has not previously entered the community game, the gaming system displays or places the player's participant at a starting position of the redemption area (or at one of a plurality of different starting positions of the redemption area). In another embodiment, regardless of if the player has previously entered the community game, the gaming system displays or places the player's participant at one of a plurality of different starting positions. In another embodiment, if the player has previously entered the community game, the gaming system displays or places the player's participant at a previously visited position associated with a previous play of the community game (i.e., a player's participant's location persists over a plurality of gaming sessions). In one such embodiment, the gaming system utilizes one or more external communication services, such as the internet, to enable a player to inquire about the player's participant's previously visited location.

After displaying or placing the player's participant at one of the plurality of displayed positions of the community game, as described above, the gaming system enables the player to place a wager on a play of the primary game as indicated in block 110 of FIG. 3. As also described above, the gaming system then determines and displays any award associated with a primary game outcome generated in association with the wagered on play of the primary game as indicted in block 112.

In addition to displaying the play of the primary game, the gaming system determines if any participant movement event occurs as indicated in block 114. In one embodiment, a participant movement event occurs based on a displayed event associated with the wagered on play of the primary game. In various embodiments, a generation of a designated symbol (or sub-symbol) or a designated set of symbols (or sub-symbols) over one or more plays of a primary game causes a participant movement event to occur. In one such embodiment, the designated symbol (or sub-symbol) may be associated with a direction of movement. In another such embodiment, the designated symbol (or sub-symbol) is not associated with any direction of movement, thus enabling the player to decide the direction of movement. In another example, each generation of a plurality of symbols (i.e., each spin of the reels) in a primary game causes a participant movement event to occur. In another embodiment, a participant movement event occurs based on an event independent of any displayed event associated with the wagered on play of the primary game. For example, after a designated period of time, the gaming system causes a participant movement event to occur for a player's participant.

If the gaming system causes a participant movement event to occur, the gaming system moves the player's participant to another displayed position of the community game as indicated in block 116. In one embodiment, the gaming system randomly selects, independent of any player input, which displayed position the player's participant will move to. For example, the gaming system displays a directional compass spinning to determine a direction of movement of the player's participant. In this example, the gaming system moves the player's participant one position in the determined direction of movement. In another embodiment, the gaming system moves the player's participant to different displayed positions according to a predetermined movement pattern.

It should be appreciated that the gaming system controlled movement of the player's participant provides that the redemption area of the community game remains populated with a plurality of moving participants which increases the level of excitement and enjoyment for players that are actively controlling their associated participants. Moreover, such random movement of each player's participant facilitates that upon a player's entry to the community game, the player's participant may or may not be located at the participant's starting position and/or the last displayed position the player moved their participant to. Such a configuration thus provides that, independent of any player input, a player's participant may be closer to or further away from one or more displayed positions associated with more lucrative awards.

In addition to moving the player's participant to one or more different displayed positions of the redemption area, the gaming system determines if a community game entry event occurs as indicated in diamond 118. If no community game entry event occurs, the gaming system returns to block 110 and enables the player to continue making wagers on plays of the primary game as described above.

On the other hand, if a community game entry event occurs, the gaming system provides the player a quantity or number of moves or turns to redeem in the ongoing community game as indicated in block 120. Each provided move or turn enables the player to move their associated participant from a current position to a different position that is adjacent to the current position. In an alternative embodiment, the gaming system enables each player to move their associated participant from a current position to a different position that is non-adjacent to the current position (i.e., the gaming system enables a player's participant to jump one or more positions).

In another embodiment, the gaming system provides the players with moves (usable upon an occurrence of a community game entry event) during one or more plays of one or more primary games. In different such embodiments, the gaming system provides such moves when one or more symbols (or sub-symbols) are generated during one or more plays of one or more primary games, when a mystery trigger occurs or when a secondary device, such as a spinning wheel or additional reel, is activated (in association with one or more plays of one or more primary games) to determine a quantity of moves or turns.

After providing the player a quantity of moves, for a first provided move, the gaming system enables the player designate which displayed position the player wants their participant to move to as indicated in block 122. That is, the gaming system enables the player to pick a destination position for their participant. In this embodiment, the destination position or plurality of destination positions available for the player to select are based on the current position of the player's participant and the quantity of positions adjacent to the current position. For example, if a player's participant is currently located at a position with only one adjacent position, the gaming system enables the player to select this one adjacent position as the destination position for the player's participant to move to. In another example, if a player's participant is currently located at a position with three adjacent positions, the gaming system enables the player to select any of these three adjacent positions as the destination position for the player's participant to move to. In certain embodiments, the gaming system enables the player to utilize a provided participant move to keep the player's participant to the participant's current position. In certain other embodiments, the gaming system requires the player to utilize a provided participant move to move the player's participant to a displayed position that is different than the player's participant's current position.

As described above, the player's participant may move to one or more different positions while the player is playing the primary game, thus when the player is provided a quantity of moves upon the player's entry to the community game, the player's participant may or may not be located at the participant's starting position and/or the last displayed position the player moved their participant to. Accordingly, because the destination position(s) available for the player to select are based on the player's participant's current position and the player's participant's current position may change as the player is playing the primary game, the destination positions available for the player to select (and thus the awards and/or award opportunities available for the player) may change as the player is playing the primary game.

After enabling the player to designate which displayed position the player wants their participant to move to, the gaming system moves the player's participant to the designated position and determines if any award is associated with the moved-to position as indicated in block 124 and diamond 126.

If an award is associated with the moved-to position, the gaming system provides the player the associated award as indicated in block 128. For example, if an award of one-hundred credits is associated with the player's participant's currently moved to position, the gaming system displays to the player (and zero, one or more other players or bystanders either at a gaming establishment or viewing over a network, such as the internet) the player's participant winning this one-hundred credit award.

After providing the player any associated award or if no award is associated with the moved-to position, the gaming system determines if any award opportunity is associated with the moved-to position as indicated in diamond 130. If an award opportunity is associated with the moved-to position, the gaming system enables the player to participate in the associated opportunity to win an award as indicated in block 132. For example, if a selection game is associated with the player's participant's moved-to position, the gaming system enables the player to play the associated selection game to determine any award for the play of the selection game. In this example, if the player picks a selection associated with a value of one-hundred credits, the gaming system displays to the player (and zero, one or more other players or bystanders either at a gaming establishment or viewing over a network, such as the internet) the player's participant winning this one-hundred credit award.

After providing the player any award determined for any associated award opportunity or determining that no award opportunity is associated with the player's participant's moved-to position, the gaming system determines if the player has at least one move remaining to redeem as indicated in diamond 134. If the player has at least one move remaining to redeem, the gaming system returns to block 122 and again enables the player to designate which displayed position the player wants their participant to move to. On the other hand, if the player has no moves remaining to redeem, the gaming system returns to block 110 and again enables the player to place a wager on a play of the primary game. That is, when the player has no moves remaining, the gaming system concludes the player's current entry into the community game and returns to the primary game. It should be appreciated that as long as the player remains playing the primary game, the player's participant remains in the redemption area and may remain randomly moving to one or more different positions of the redemption area.

In one alternative embodiment, if a participant movement event occurs, the gaming system enables the player to decline any movement of their participant. In another alternative embodiment, if a participant movement event occurs, the gaming system enables the player to defer any movement of their participant. In this embodiment, the gaming system enables the player to save such participant movements for a future point in time (which may be player selected or selected by the gaming system).

In another embodiment, the gaming system determines one or more destination positions available for the player to select to move their participant to. In different such embodiments, the determined destination positions are independent of the current position of the player's participant and/or independent of the quantity of position moves provided to the player. That is, in these embodiments, rather than enabling a player to move their participant to one or more adjacent positions (or one or more positions located within a designated distance of the player's participant's current position), the gaming system determines, regardless of the player's participant's current position, one or more destination positions (in one or more redemption areas) and enables the player to select one of these determined destination positions to move their participant to. In another embodiment, the gaming system randomly select which destination position the player's participant will move to. In one such embodiment, the gaming system randomly selects a plurality of destination positions and the player selects which of these randomly selected destination positions their participant will move to. In another such embodiment, the player selects a plurality of destination positions and the gaming system randomly selects which of these player selected destination positions the player's participant will move to.

In one embodiment, for a provided move, if the player does not select a position as the destination position for that move within a designated period of time, the gaming system selects a position as the destination position for the player based on one or more pre-defined rules. In another embodiment, for a provided move, if the player does not select a position as the designated position for that move, the gaming system causes the player to forfeit that provided move. In another embodiment, for a provided move, if the player does not select a position as the designated position for that move, the gaming system converts the provided move to an award for the player. In another embodiment, for a provided move, if the player does not select a position as the destination position for that move, the gaming system saves that position move and enables the player to subsequently use the saved position move within the triggered community game. In another embodiment, for a provided move, if the player does not select a position as the destination position for that move, the gaming system saves that position move and enables the player to subsequently use the saved position move within a subsequently triggered community game.

In another embodiment, when the player has no moves remaining, the gaming system enables the player to save any winnings associated with their current entry into the community game. In another embodiment, if the player has at least one move remaining, the gaming system enables the player to save any winnings associated with their current entry into the community game (i.e., the player selectively exits the community game with a quantity of moves remaining). In these embodiments, rather than returning to the primary game with the winnings from the current entry into the community game, the gaming system enables a player to bank such winnings for a future entry into the community game. If the player elects to bank such winnings for a future entry into the community game, the player's winnings are held over and applied for that future entry. In one such embodiment, if the gaming system employs one or more modifiers to the winnings of an entry of a community game and if the player elected to hold any winnings from a previous entry over to a current entry, the gaming system modifies the player's total winnings (i.e., the winnings from the previous entry and the winnings from the current entry) to provide a more lucrative award for the player. In one such embodiment, if a player decides to save any winnings for a future entry into the community game, the gaming system periodically notifies the player of such deferred winnings.

Award/Award Opportunity Modification

In one embodiment, the gaming system modifies any award and/or award opportunity associated one or more of the displayed positions for a designated duration. In one such embodiment, one or more of the displayed positions are associated with modified awards (or award opportunities having modified average expected payouts) at different points in time. In different embodiments, at certain points in time or in response to one or more events occurring (either in a play of a primary game, a play of the ongoing community game or independent of any play of the primary game or any play of the ongoing community game), the awards associated with one or more adjacent displayed positions temporarily have an increased value and the award opportunities associated with one or more adjacent displayed positions temporarily have an increased average expected value. For example, at a first point in time, a displayed position of the redemption area of the community game is associated with a default award of fifty credits. In this example, at a second point in time, the same displayed position of the redemption area of the community game is associated with an increased award of one-hundred-fifty credits. Such a configuration provides that the award or award opportunity provided to a player in response to a player's participant's movement is based not only on which displayed position the player designates their participant to move to, but also on if the moved-to position is currently associated with an increased award (or an award opportunity having an increased average expected payout).

Figure 4B:
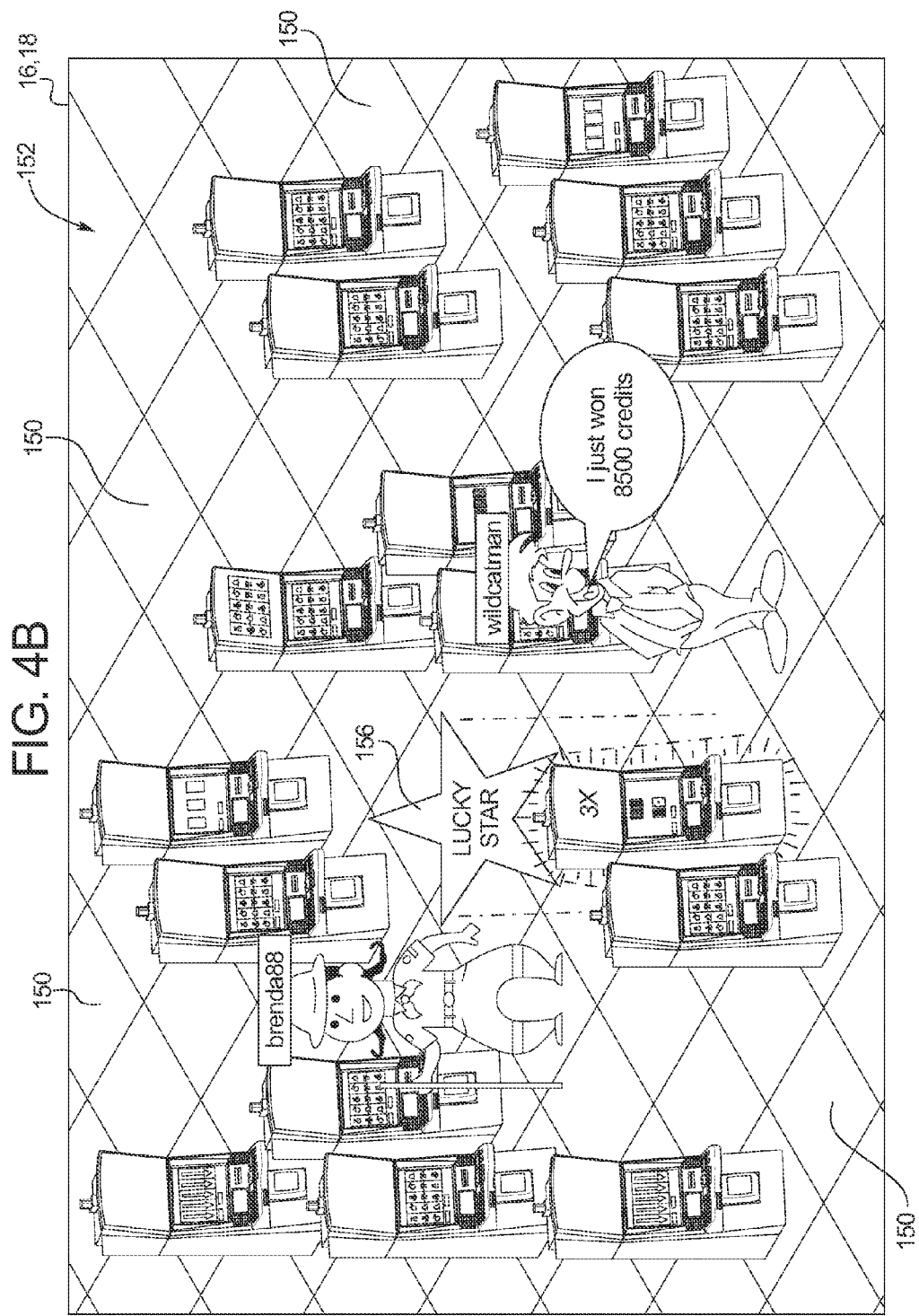
FIG. 4B is a front view of one embodiment of the gaming system disclosed herein illustrating a plurality of displayed positions of a redemption area of an ongoing community game, wherein certain of the displayed positions are associated with modified awards or award opportunities having modified average expected payouts.

In one embodiment, the gaming system indicates to the players which displayed positions are temporarily associated with increased awards or increased average expected payouts (and which displayed positions are not associated with increased awards or increased average expected payouts). For example, as seen in FIG. 4B, the gaming system indicates to the players of the community game (and any bystanders watching the play of the community game) that certain of the displayed positions 150 are each associated with increased awards and/or award opportunities having increase average expected payout. In this illustrated example, the gaming system indicates which positions are associated with increased awards and/or increased average expected payouts by displaying an indicator, such as star symbol 156, located over such positions. It should be appreciated that since the gaming system indicates to the players which positions are associated with increased awards and/or award opportunities having increase average expected payout, one or more players in control of their participant may attempt to move their participant to such increased awards or increased award opportunities. For example, as seen in FIG. 4B, the player's controlling the participants named "brenda88" and "wildcatman" each have moved their respective participant closer to the increased award opportunity indicated by the star symbol in an attempt to play such an award opportunity.

In one embodiment, a modification of an award or average expected payout of an award opportunity last until a player's participant is provided the modified award or participates in the award opportunity having a modified average expected payout. In another embodiment, a modification of an award or average expected payout of an award opportunity last until a plurality of player's participants are provided the modified award or participate in the award opportunities having a modified average expected payout. In another embodiment, a modification of an award or average expected payout of an award opportunity lasts for a designated period of time or a quantity of games played.

In one embodiment, different displayed positions of the community game are associated with different modifications to any associated awards and/or award opportunities at different points in time. In this embodiment, the gaming system temporarily associates one set of displayed positions with a first modification, such as an increase of any awards by 15%, and temporarily associates one set of displayed positions with a second modification, such as an increase of any associated awards by 40%. Such a configuration provides that the award or award opportunity provided to a player in response to a player's participant's movement is based not only on which displayed position the player designates their participant to move to, but also on if the moved-to position is currently associated with an increased award (or an award opportunity having an increased average expected payout) and which of the different available modifications the moved-to position is currently associated with.

In one embodiment, when a player stops playing the primary games of the gaming system (or otherwise becomes inactive), the player's participant disappears from the redemption area. In this embodiment, when the player again begins playing the primary games (or otherwise becomes active), the player's participant reappears in the redemption area. In another embodiment, as described above, when a player stops playing the primary games of the gaming system (or otherwise becomes inactive), the player's participant remains within the redemption area. It should be appreciated that in this embodiment, since the player's participant randomly moves throughout the redemption area (or moves according to a predetermined pattern) while the player is playing one or more primary games, independent of any player input otherwise, the player's participant may randomly move to one or more displayed positions temporarily having an increased award (or an award opportunity with an increased average expected payout). This embodiment facilitates that when the player enters and/or reenters the redemption area, the player's participant may be located closer to or further away from one or more displayed positions each having an increased award (or an award opportunity with an increased average expected payout).

Deferred Entry of Ongoing Community Game

In another embodiment, if a community game entry event occurs, such as after a designated quantity of plays of the primary game of one of the gaming devices, the gaming system enables a player to take control of their participant (as described above) or defer taking control of their participant (i.e., defer participation in the community game) until a subsequent point in time. That is, the gaming system enables a player to save entries into the community game and selectively enter the community game. In one such embodiment, the gaming system enables a player to save one or more community game entries wherein when the player decides to begin actively controlling their participant, the gaming system then determines the number of moves to provide to the player for that community game entry. In another such embodiment, the gaming system enables a player to save one or more community game entries and save a quantity of moves to use in the community game.

In another embodiment, if a community game entry event occurs in association with a player playing the primary game of one of the gaming devices, the gaming system determines a quantity of moves for the player and enables the player to use such moves to take control of their participant (as described above) or defer using such moves and thus defer taking control of their participant (i.e., defer participation in the community game) until a subsequent point in time. That is, the gaming system enables a player to save moves into the community game and selectively enter the community game with these saved moves, such as via a smart-phone after the player has left the gaming establishment with one or more saved moves.

In one embodiment, saved entries and/or saved moves are associated with an expiration date and time. In this embodiment, the gaming system is configured to communicate to the player the proximity of the expiration of any saved entries and/or saved moves (i.e., "your saved community game entries will expire at 6:00 am tomorrow"). In one embodiment, such notice of expiration of saved entries and/or saved moves is at the player's currently played gaming device. In another embodiment, such notice of expiration of saved entries and/or saved moves is external from the player's currently played gaming device, such as via e-mail or SMS text. In different embodiments, community game entries and/or moves provided at different times are redeemed in order of expiration (first to expire shows first), or in order of first earned basis.

In one embodiment wherein the gaming system indicates to the players which displayed positions are temporarily associated with increased awards or increased average expected payouts, a player with at least one saved entry and/or saved move may utilize a saved entry and/or saved move and take control of their participant when either the player's participant has randomly moved to or near one or more displayed positions temporality having an increased award (or an award opportunity with an increased average expected payout) and/ or the gaming system indicates that one or more displayed positions located at or near the player's participant's current position are temporarily associated with increased awards or award opportunities having increased average expected payouts. In this embodiment, the gaming system enables one or more players to selectively enter the community game when the player determines there is an increased probability of winning any awards or winning more lucrative awards. Such an embodiment provides an increased level of excitement and entertainment as player's must decide whether to currently redeem their entry and/or saved moves in the community game or wait to redeem their entry and/or saved moves in the community game when the conditions for winning an award could be more or less favorable for the player.

Enrollment in Community Game

In one embodiment, in addition to designing how a player's participant or avatar will look, the gaming system enables a player to select one or more features associated with the player's participant. In one embodiment, which of a plurality of different types of an available feature the player selects will affect the player's participant's success in the community game. For example, a first type of weapon or magic spell available to be selected by the player may work against a first kind of monster in the redemption area (but not against a second, different kind of monster) while a second type of weapon or magic spell available to be selected by the player may work against the second kind of monster in the redemption area (but not against the first kind of monster). In this example, the player's participant's chances of advancing in the community game may be based, at least in part, on which weapon or magic spell the player selected and which type of monster the player's participant encounters in the community game. In another embodiment, which of a plurality of different available features the player selects will affect the player's participant's success in the community game. For example, the gaming system enables the player to select between having advanced weaponry (combined with non-advanced armor) or having advanced armor (combined with non-advanced weaponry). In this example, the player's participant's chances of advancing in the community game may be based, at least in part, on whether the player's participant requires more advanced weaponry or more advanced armor.

In one embodiment, the gaming system causes the player's participant to change or evolve as the player's participant moves throughout the redemption area of the community game. For example, the gaming system enables the player's participant to collect or upgrade certain features and downgrade certain other features. In another embodiment, the gaming system causes the player's participant to change or evolve based on one or more side wagers placed or other consideration provided by the player.

In one embodiment, the gaming system enables a player that is enrolled in the community game to unenroll or opt-out of the community game. In different embodiments, the gaming system enables a player to opt-out of the community game at a designated time, upon the player selecting to opt-out from the community game, upon a designated event occurring (such as the player's credit meter falling below a threshold) or upon any suitable occurrence. In different embodiments, if the player opts-out of community game, the gaming system enables the player to save or retain the player's participant, the player's participant's current location in the redemption area and/or one or more of any accumulated moves to be used in the redemption area. In another such embodiment, if the player opts-out of the community game, the gaming system causes the player to forfeit the player's participant, the player's participant's current location in the redemption area and/or any accumulated moves to be used in the redemption area.

In one embodiment, the gaming system establishes a gaming device account for participation in the community game. In such embodiments, either a player or a gaming establishment operator can elect for a gaming device to participate in the community game, wherein if the gaming device is determined to participate in the community game, the gaming system establishes an account (or otherwise accesses a previously established account) for the gaming device. It should be appreciated that in this embodiment, the participant and any data associated with the participant are stored in an account associated with the gaming device and are not specific to the player that is playing that gaming device at any particular point in time.

In another embodiment, as mentioned above, the gaming system disclosed herein can be implemented in a networked environment, such as over the Internet. In an Internet embodiment, the gaming system disclosed herein is implemented using one or more servers, and individual users that access the servers (and participate in the ongoing community game) by logging on from a personal web browser or mobile device (e.g., a smart phone running an Internet-enabled application). In one such embodiment, while in a physical gaming establishment, a player's participant moves throughout one or more redemption areas obtaining zero, one or more community awards for the player. In this embodiment, when the player is subsequently remote from the physical gaming establishment and accesses the ongoing community game, the player's participant remains moving throughout one or more of the redemption areas. Thus, when the player returns to the physical gaming establishment, the player's participant may be located at a different position (from the player's last visit to the physical gaming establishment) which may be closer to or further away from one or more displayed positions having one or more lucrative awards or award opportunities. Such an embodiment provides that a player's actions both at the physical gaming establishment and remote from the physical gaming establishment affect the player's play of the ongoing community game and thus may affect the awards provided to the player in association with the ongoing community game.

In one such embodiment, the gaming system employs a remote user interface (such as a website accessible via a data network such as an internet). In this embodiment, the gaming system enables users (i.e., players that are remote from any gaming establishment) to make a plurality of different inputs to modify a plurality of different characteristics or features associated with their participant. In one embodiment, the gaming system determines whether to accumulate any community game moves for a participant based on any inputs made by a user to modify one or more of the characteristics or features associated with the users participant.

In one embodiment, the gaming system also enables users to associate their participants with one or more redemption areas via the remote user interface. In one embodiment, if a participant associated with a user is eligible to move throughout a redemption area, such as a recently added redemption area, the gaming system enables the user to enter or otherwise associate their participant with that redemption area by making one or more inputs via the remote user interface.

In addition to utilizing the remote user interface to cause the gaming system to accumulate any community game moves for a participant, the gaming system also enables users to interact with one another via the remote user interface. For example, users can interact with one another through elements such as a plurality of different discussion forums. In one embodiment, users utilize these different discussion forums to discuss redemption areas and topics relating to their participants. In one embodiment, users utilize these discussion forums and other various remote user interface options to buy, sell and trade attributes of their participants.

Additionally, the gaming system enables users to monitor a plurality of different statistics and attributes associated with their participant via the remote user interface. For example, users can view statistics associated with their participant, including but not limited to: current participant power, current participant eligibility for different redemption areas, and previous redemption areas and/or displayed positions visited by their participant.

Participants

In various embodiments, the players for the ongoing community game include one or more of: (i) players playing gaming devices at a gaming establishment, (ii) players playing wagering games online or via a mobile device, (iii) players playing non-wagering games online or via a mobile device. In one embodiment, each participant displayed or presented in the redemption area of the ongoing community game is associated with a player playing the ongoing community game either at a gaming establishment or remotely via a network (i.e., over the internet). In another embodiment, one or more participants displayed or presented in the redemption area of the ongoing community game are internet gaming bots programmed to play the ongoing community game. In one such embodiment, the moves these internet gaming bots make during the ongoing community game are based on one or more player's moves in one or more previous plays of the ongoing community game.

In one embodiment, as described above, when a player is not actively controlling their participant's movement in the redemption area of the ongoing community game, a player's participant moves throughout the redemption area either randomly or according to a predetermined movement pattern. In another embodiment, when a player is not actively controlling their participant's movement in the redemption area of the ongoing community game, a player's participant moves throughout the redemption area either randomly or according to a predetermined movement pattern when such movement benefits the player. That is, if a random or predetermined movement will move the player's participant further away from a displayed position having a lucrative award (or a lucrative award opportunity), the gaming system will not move the player's participant away from such a displayed position. In another embodiment, if a random or predetermined movement will move the player's participant further away from a displayed position having a lucrative award (or a lucrative award opportunity), the gaming system enable the player to select whether they want their participant to move or remain in its current position.

In one embodiment, a player's participant functions as a messenger which conveys information about the player to any other player (or bystander) currently monitoring the ongoing community game. That is, unlike certain known community games in which a player is only able to view what that player wins (and is unable to see what other player's win), a player's participant of the present disclosure enables other players (or bystanders of the community game) to view how and what a player wins. In one embodiment, a player's participant conveys information not only about a player's awards obtained in the ongoing community game, but also about a player's awards obtained during that player's play of a primary game. For example, when player gets a significant win in the primary game, this win is celebrated and advertised by that player's participant such as by presenting appropriate messages such as "I JUST WON 10× MY BET" and "I'M ON FIRE" to the player visually, or through suitable audio or audiovisual displays. Such announcements give other players an indication of a winning gaming experience and emulates a casino experience at a bank of machines.

Redemption Area

In one embodiment, the community game includes one redemption area which is formed from a plurality of displayed positions. In different embodiments, the plurality of displayed positions of the redemption area form a orthogonal layout, a non-orthogonal layout or any other suitable layout. In another embodiment, the community game includes a plurality of redemption areas which are each formed from a plurality of displayed positions. In these embodiments, the displayed positions of each redemption area are connected to one another, such that each displayed position is adjacent to at least one other displayed position and a plurality of displayed positions are each adjacent to a plurality of other displayed positions (e.g., a grid of positions). In such embodiments, the displayed positions and/or plurality of redemption areas are connected to each other by one or more trails, paths, roads or portals (which enable a participant to teleport from one location to another).

In one embodiment including a plurality of redemption areas, the gaming system enables a player to select which of the plurality of redemption areas they want their participant initially displayed in. In another embodiment, the gaming system selects which of the plurality of redemption areas to initially display each participant at. In one embodiment, the gaming system requires a player to earn access to one or more redemption areas (i.e., certain redemption areas are available to all players and certain redemption areas are available to designated players). In one embodiment, the gaming system enables a player to select when they want their participant to switch from one redemption area to another redemption area. In another embodiment, the gaming system causes a player's participant to randomly switch from one redemption area to another redemption area.

In one embodiment, as described above, one or more displayed positions which form the redemption area(s) of the ongoing community game are each associated with an award and/or an award opportunity. In another embodiment, each of the displayed positions which form the redemption area(s) of the ongoing community game are associated with an award and/or an award opportunity. In another embodiment, each displayed position within each player's participant's range of movement for an entry into the community game is associated with an award and/or an award opportunity. This embodiment provides that for each entry into the community game, the player's participant will move to at least one display position associated with an award and/or an award opportunity and thus each player will be provided an award and/or an award opportunity for each entry into the community game. In another embodiment, each displayed position within each player's participant's range of movement for an entry into the community game is not associated with an award and/or an award opportunity. This embodiment provides that for each entry into the community game, the player's participant may not move to at least one display position associated with an award and/or an award opportunity and thus each player may not be provided an award and/or an award opportunity for each entry into the community game.

In one embodiment, the gaming system displays to the players (and to any bystanders either at a gaming establishment or viewing over a network, such as the internet) the awards and/or award opportunities associated with the displayed positions. In another embodiment, the gaming system displays to the players (and to any bystanders either at a gaming establishment or viewing over a network, such as the internet) information or hints regarding the awards and/or award opportunities associated with the displayed positions. In these embodiments, if a player is aware that their associated participant is near a displayed position associated with a lucrative award (or a lucrative award opportunity), the player may increase their rate of play in attempt to move their participant even closer to such displayed positions. That is, in certain situations, a player may alter their play of the primary game in response to the current configuration or status of the ongoing community game.

In another embodiment, the gaming system does not display to any players (and to any bystanders either at a gaming establishment or viewing over a network, such as the internet) the awards and/or award opportunities associated with the displayed positions. In another embodiment, the gaming system displays to the players (and to any bystanders either at a gaming establishment or viewing over a network, such as the internet) the awards and/or award opportunities associated with certain of the displayed positions and does not display to any players (and to any bystanders either at a gaming establishment or viewing over a network, such as the internet) the awards and/or award opportunities associated with certain others of the displayed positions.

In one embodiment, if a participant movement event occurs and the player's participant is moved to a displayed position associated with an award, the gaming system provides the associated award to the player. In another embodiment, if a participant movement event occurs and the player's participant is moved to a displayed position associated with an award opportunity, the gaming system causes the award opportunity to occur (either with or without the player's involvement) and provides any determined award for the associated award opportunity to the player. In these embodiments, the gaming system provides the player one or more community game awards while the player is playing the primary game of the gaming device (i.e., when the player is not actively participating in the community game). In another embodiment, if a participant movement event occurs and the player's participant is moved to a displayed position associated with an award (or an award opportunity), any award (or potential award from the associated award opportunity) is forfeited and not provided to the player.

In one embodiment, a plurality of the award opportunities associated with a plurality of the displayed positions have different average expected payouts. In another embodiment, a plurality of the award opportunities associated with a plurality of the displayed positions have the same average expected payout. In another embodiment, a plurality of the award opportunities associated with a plurality of the displayed positions are each associated with a different range of awards available to be provided to the player. In another embodiment, a plurality of the award opportunities associated with a plurality of the displayed positions are each associated with the same range of awards available to be provided to the player. In these embodiments, different displayed positions are associated with different award opportunities having different volatilities such that a participant's movement to a displayed position determines the volatility of at least a portion of the player's community game experience.

In different embodiments, one or more of the community game awards associated with one or more of the displayed positions include, but are not limited to: credit amounts, modifiers (e.g., multipliers), physical prizes, free spins, progressive awards, a value, virtual goods associated with the gaming system, virtual goods not associated with the gaming system, and a modifier.

In different embodiments, one or more of the community game award opportunities associated with one or more of the displayed positions include, but are not limited to: a play of any suitable slot game, a play of any suitable free spins or free activations game, a play of any suitable wheel game, a play of any suitable card game, a play of any suitable offer and acceptance game, a play of any suitable award ladder game, a play of any suitable puzzle-type game, a play of any suitable persistence game, a play of any suitable selection game, a play of any suitable cascading symbols game, a play of any suitable ways to win game, a play of any suitable scatter pay game, a play of any suitable coin-pusher game, a play of any suitable elimination game, a play of any suitable stacked wilds game, a play of any suitable trail game, a play of any suitable bingo game, a play of any suitable video scratch-off game, a play of any suitable pick-until-complete game, a play of any suitable shooting simulation game, a play of any suitable racing game, a play of any suitable promotional game, a play of any suitable high-low game, a play of any suitable lottery game, a play of any suitable number selection game, a play of any suitable dice game, a play of any suitable skill game, a play of any suitable auction game, a play of any suitable reverse-auction game, a play of any suitable group game or a play of any other suitable type of game.

In one such embodiment, the award opportunity associated with at least one of displayed positions is a selection game in which an award value is associated with one or more of the available selections. In another such embodiment, the award opportunity associated with at least one of the displayed positions is an elimination game in which several awards and multipliers are shown, the awards and multipliers are strategically eliminated one by one and the player is provided the final award and multiplier that remains. In another such embodiment, the award opportunity associated with at least one of the displayed positions is a weighted wheel game in which a player spins a weighted wheel to win an award.

In other such embodiments, the award opportunity associated with at least one of the displayed positions is a single payline three reel slot game or multiple payline three reel slot game. In other such embodiments, the award opportunity associated with at least one of the displayed positions is a multiple payline, multiple coin five reel slot game, a tumbling or cascading reels five reel slot game, a multiway five reel slot game or a payline and multiway five reel slot game.

In another such embodiment, the award opportunity associated with at least one of the displayed positions is a slot game in which a player wins one or more spins. In this embodiment, a player is provided a number of winning spins, wherein with each provided spin, the player gets to keep spinning the reels until there is a winning outcome. In one such embodiment, the gaming system provides a bonus award or a consolation award for a number of spins without a win.

In another such embodiment, the award opportunity associated with at least one of the displayed positions is a three reel slot game with symbol accumulators and without paylines. In this embodiment, each symbol has an accumulator with an associated award, wherein the player accumulates three or more of a symbol to earn the associated award. In different embodiments, the game ends when a limited number of free spins are complete, after first accumulator is filled, after special bonus-ending symbol accumulator is filled, or after an ending symbol is generated on each reel to lock each reel (i.e., each reel has an ending symbol and when that symbol appears on a reel, that reel becomes locked).

In another such embodiment, the award opportunity associated with at least one of the displayed positions is a five reel slot game with a single symbol and no paylines. In this embodiment, the player is provided a number of spins and a single reel or wheel is used to select the symbol for the game. The gaming system determines the award to provide to the player based on the total number of the selected symbol that appears over the provided number of spins.

In another embodiment, one or more of the displayed positions are each associated with an outcome. In this embodiment, the outcomes include, but are not limited to: free spin upgrades (such as additional wild symbols), player status upgrades (such as leveling-up to a next achievement level), entry for a future automated drawing, entry for a live-action drawing, Nx multipliers on the player's participant's next M moves, wild reels for one or more plays of a reel game, two way pays, extra free spins for a play of a reel game, do-overs, no-win respins (e.g., respins a losing outcome in a reel game), position transporters (e.g., moves the player's participant to another displayed position of the redemption area), award opportunity transporters (e.g., changes the award opportunity for the player), accumulators (e.g., collect X number of accumulator symbols and win a progressive award), position move incrementors (e.g., gain X number of moves on your next entry into the community game or double your next movement), position move decrementors (e.g., lose X number of moves on your next entry into the community game), anti-blockers (e.g., jump over or pass through a blocking participant) and participant movers (e.g., an outcome which causes one or more other participants to be relocated one or more positions). In another embodiment, certain of the positions are associated with penalty outcomes, such as, but not limited to: a lose a move penalty, a lose x multipliers penalty, a lose y free activations or spins penalty, a lose z amount of credits collected so far penalty, a move back n positions penalty, and/or a move back to a start position penalty.

In one embodiment, the magnitude of the award, award opportunity or outcome changes for different portions of the redemption area. For example, positions located further from the starting positions of the redemption area will, on average, be associated with higher value awards. In another embodiment, the award values associated with various positions in the redemption area are variable. In one such embodiment, the value of a position increases each time a participant lands on a position (or passes by a position). In another such embodiment, the value of various positions decrease in value each time a participant lands on that position (or passes by that position). It should be appreciated that different disclosed position features can be simultaneously employed for one or more of the positions in the redemption area.

In one embodiment, only one participant may be located at a displayed position at any point in time. In another embodiment, a plurality of participants may each be located at the same displayed position at a point in time. In certain such embodiments, each player associated with each participant located at the same displayed position is: (i) provided any award associated with the displayed position, or (ii) individually participates in any award opportunity associated with the displayed position. In another certain other embodiments, each player associated with each participant located at the same displayed position is provided: (i) a portion of any award associated with the displayed position, or (ii) participates with the other players in any award opportunity associated with the displayed position (i.e., a group award opportunity).

In one embodiment, the gaming system enables a player to cause the participant associated with a different player to move to a different displayed position. In one such embodiment, if another player's participant is already occupying a displayed position in the redemption area, the gaming system enables the player to cause the other player's participant to move such that the player's participant may move to that displayed position. In these embodiments, one player's actions affect another player's involvement in the ongoing community game and may affect the awards and/or award opportunities available to the other player. In another embodiment, the gaming system enables players to trade or swap the positions of their respective participants. In one such embodiment, the gaming system enables a first player to sell, such as for money or other suitable game currency, the position associated with their participant to a second player associated with a participant at a different location.

In another embodiment, the gaming system enables a player to access one or more maps of the redemption area. In one such embodiment, the gaming system enables the player to utilize the map to initially place their player participant in the redemption area. In another such embodiment, the gaming system enables the player to utilize the map to determine which previously visited positions are associated with which awards. This embodiment enables the player to incorporate an element of strategy in moving their participant around the redemption area.

Alternative Embodiments

It should be appreciated that in different embodiments, one or more of:
i. one or more characteristics of a player's participant;
ii. one or more features of a player's participant
iii. which of a plurality of different starting positions a player's participant is initially positioned at;
iv. which of a plurality of different redemption areas a player's participant is initially positioned at
v. when a community game entry event occurs;
vi. a quantity of moves to utilize in the redemption area;
vii. a size or quantity of positions in a redemption area;
viii. which awards are associated with which positions in a redemption area;
ix. which award opportunities are associated with which positions in a redemption area;
x. which game or games will be played in association with each award opportunity;
xi. when a participant movement event occurs (i.e., when to initiate a non-player controlled movement of a player's participant);
xii. where to move a player's participant upon an occurrence of a participant movement event;
xiii. a quantity of displayed positions which will be associated with a modified or increased award and/or award opportunity having a modified or increased average expected award;
xiv. which displayed positions will be associated with a modified or increased award and/or award opportunity having a modified or increased average expected award;
xv. a duration (i.e., number of moves, amount of time) a displayed position will be associated with a modified or increased award and/or award opportunity having a modified or increased average expected award;
xvi. which of a plurality of modified or increased awards and/or modified or increased award opportunities will be associated with a displayed position;
xvii. when to enable a player to save one or more community game entries or participant moves;
xviii. a duration which a player may save one or more community game entries or participant moves;
xix. a quantity of community game entries or participant moves a player may save at any point in time;
xx. the determination of whether or not a player is provided the opportunity to participate in the community game;
xxi. any determination disclosed herein;
is/are predetermined, randomly determined, randomly determined based on one or more weighted percentages, determined based on a generated symbol or symbol combination, determined based on a random determination by the central controller, determined based on a random determination at the gaming system, determined based on a player's selection, determined based on one or more side wagers placed, determined based on the player's primary game wager, determined based on time (such as the time of day), determined based on an amount of coin-in accumulated in one or more pools, determined based on a status of the player (i.e., a player tracking status), or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A gaming system comprising:
a plurality of gaming devices, each gaming device including:
at least one input device;
at least one display device;
at least one processor; and
at least one memory device which stores a plurality of instructions, which when executed by the at least one processor, causes the at least one processor to operate with the at least one input device and the at least one display device to enable a player to play a primary wagering game, each player being associated with an individual participant; and
at least one controller configured to communicate with each of the gaming devices, said at least one controller programmed to:

(a) independent of any occurrence of any community game triggering event:
  (i) cause a display of:
    (A) a community game matrix including a plurality of displayed positions, a plurality of the displayed positions each being associated with a community game award opportunity having one of a plurality of different average expected payouts, and
    (B) for each of the plurality of players, the individual participant associated with the player at one of the plurality of displayed positions, and
  (ii) for a designated period of time, modify at least one of the average expected payouts of at least one of the community game award opportunities associated with at least one of the displayed positions;
(b) if a community game entry event occurs:
  (i) determine a quantity of position moves associated with one of the players, and
  (ii) accumulate the determined quantity of position moves in association with the player;
(c) enable the players to each selectively redeem any accumulated position moves; and
(d) if one of the players selectively redeems any accumulated position moves, for each of the redeemed position moves:
  (i) enable the player to designate one of the displayed positions, wherein which of the displayed positions available to be designated by the player is based on the position the individual participant associated with the player is displayed at,
  (ii) cause a display of the individual participant associated with the player moving to the designated displayed position, and
  (iii) if the designated displayed position is associated with a community game award opportunity:
    (A) determine any community game award associated with the community game award opportunity, said determination being based on one of: the average expected payout of the community game award opportunity and the modified average expected payout of the community game award opportunity, and
    (B) cause any determined community game award to be provided to the player.

2. The gaming system of claim 1, wherein the at least one controller is programmed to:
  (i) determine if a participant movement event occurs, and
  (ii) if the participant movement event occurs, independent of any player designation of any of the displayed positions, cause a display of the individual participant associated with one of the players moving to a different displayed position.

3. The gaming system of claim 2, wherein the participant movement event occurs based, at least in part, on at least one event occurring in association with at least one of the plays of the primary game wagered on by the player.

4. The gaming system of claim 2, wherein if the participant movement event occurs and the individual participant associated with the player is moved to a different displayed position, the at least one controller is programmed to cause any community game award determined in association with any community game award opportunity associated with the moved to displayed position to be provided to the player.

5. The gaming system of claim 1, wherein at least one of the displayed positions is associated with a first community game award opportunity having a first average expected payout and at least one of the displayed positions is associated with a second, different community game award opportunity having a second, different average expected payout.

6. The gaming system of claim 1, wherein each of the displayed positions is associated with one of a plurality of community game award opportunities.

7. The gaming system of claim 1, wherein the at least one controller is programmed to cause at least one community display device to display at least one of: the community game matrix including the plurality of displayed positions, at least one individual participant associated with at least one of the players, at least one of any community game awards provided to at least one of the players, at least one of any community game award opportunities, a quantity of any position moves accumulated in association with one of the players.

8. The gaming system of claim 1, wherein the designated period of time includes a quantity of community game awards provided in association with said community game award opportunity.

9. A method of providing an ongoing community game, said method comprising:
(a) for each of a plurality of gaming devices, enabling a player to play a primary wagering game, each player being associated with an individual participant;
(b) independent of any occurrence of any community game triggering event:
  (i) causing at least one display device to display:
    (A) a community game matrix including a plurality of displayed positions, a plurality of the displayed positions each being associated with a community game award opportunity having one of a plurality of different average expected payouts, and
    (B) for each of the plurality of players, the individual participant associated with the player at one of the plurality of displayed positions, and
  (ii) for a designated period of time, causing at least one processor to execute a plurality of instructions to modify at least one of the average expected payouts of at least one of the community game award opportunities associated with at least one of the displayed positions;
(c) if a community game entry event occurs:
  (i) causing the at least one processor to execute the plurality of instructions to determine a quantity of position moves associated with one of the players, and
  (ii) causing the at least one processor to execute the plurality of instructions to accumulate the determined quantity of position moves in association with the player;
(d) enabling the players to each selectively redeem any accumulated position moves; and
(e) if one of the players selectively redeems any accumulated position moves, for each of the redeemed position moves:
  (i) enabling the player to designate one of the displayed positions, wherein which of the displayed positions available to be designated by the player is based on the position the individual participant associated with the player is displayed at,
  (ii) causing the at least one display device to display the individual participant associated with the player moving to the designated displayed position, and
  (iii) if the designated displayed position is associated with a community game award opportunity:
    (A) causing the at least one processor to execute the plurality of instructions to determine any community game award associated with the community game award opportunity, said determination being, based on one of: the average expected payout of the community game award opportunity and the modified average expected payout of the community game award opportunity, and (B) causing any determined community game award to be provided to the player.

10. The method of claim 9, which includes:

(i) causing the at least one processor to execute the plurality of instructions to determine if a participant movement event occurs, and (ii) if the participant movement event occurs, independent of any player designation of any of the displayed positions, causing the at least one display device to display the individual participant associated with one of the players moving to a different displayed position.

11. The method of claim 10, wherein the participant movement event occurs based, at least in part, on at least one event occurring in association with at least one of the plays of the primary game wagered on by the player.

12. The method of claim 10, which includes, if the participant movement event occurs and the individual participant associated with the player is moved to a different displayed position, causing any community game award determined in association with any community game award opportunity associated with the moved to displayed position to be provided to the player.

13. The method of claim 9, wherein at least one of the displayed positions is associated with a first community game award opportunity having a first average expected payout and at least one of the displayed positions is associated with a second, different community game award opportunity having a second, different average expected payout.

14. The method of claim 9, wherein each of the displayed positions is associated with one of a plurality of community game award opportunities.

15. The method of claim 9, which includes causing at least one community display device to display at least one of: the community game matrix including the plurality' of displayed positions, at least one individual participant associated with at least one of the players, at least one of any community game awards provided to at least one of the players, at least one of any community game award opportunities, a quantity of any position moves accumulated in association with one of the players.

16. The method of claim 9, wherein the designated period of time includes a quantity of community game awards provided in association with said community game award opportunity.

17. The method of claim 9, which is provided through a data network.

18. The method of claim 17, wherein the data network is the internet.

* * * * *

UNITED STATES PATENT AND TRADEMARK OFFICE
CERTIFICATE OF CORRECTION

PATENT NO. : 8,475,265 B2  Page 1 of 1
APPLICATION NO. : 13/247024
DATED : July 2, 2013
INVENTOR(S) : Ernest M. Lafky et al.

It is certified that error appears in the above-identified patent and that said Letters Patent is hereby corrected as shown below:

IN THE CLAIMS

In Claim 1, Column 38, Line 60, replace "causes" with --cause--.
In Claim 3, Column 39, Line 56, replace "of the plays" with --play--.
In Claim 7, Column 40, Line 14, between "," and "a" insert --and--.
In Claim 9, Column 41, Line 1, delete the second instance of ",".
In Claim 11, Column 41, Line 19, replace "of the plays" with --play--.
In Claim 15, Column 42, Line 12, replace "plurality'" with --plurality--.
In Claim 15, Column 42, Line 16, between "," and "a" insert --and--.
In Claim 18, Column 42, Line 26, replace "the" with --an--.

Signed and Sealed this
Eleventh Day of February, 2014

Michelle K. Lee
*Deputy Director of the United States Patent and Trademark Office*